US011836583B2

(12) United States Patent
Chu et al.

(10) Patent No.: US 11,836,583 B2
(45) Date of Patent: Dec. 5, 2023

(54) METHOD, APPARATUS AND SYSTEM FOR SECURE VERTICAL FEDERATED LEARNING

(71) Applicant: HUAWEI CLOUD COMPUTING TECHNOLOGIES CO., LTD., Gui Zhou Province (CN)

(72) Inventors: Lingyang Chu, Burnaby (CA); Yutao Huang, Port Moody (CA); Yong Zhang, Richmond (CA); Lanjun Wang, Burnaby (CA)

(73) Assignee: HUAWEI CLOUD COMPUTING TECHNOLOGIES CO., LTD.

( * ) Notice: Subject to any disclaimer, the term of this patent is extended or adjusted under 35 U.S.C. 154(b) by 327 days.

(21) Appl. No.: 17/014,204

(22) Filed: Sep. 8, 2020

(65) Prior Publication Data

US 2021/0073678 A1 Mar. 11, 2021

Related U.S. Application Data

(60) Provisional application No. 62/897,808, filed on Sep. 9, 2019.

(51) Int. Cl.
*G06N 20/00* (2019.01)
*G06Q 30/02* (2023.01)
*G06Q 30/0201* (2023.01)

(52) U.S. Cl.
CPC ......... *G06N 20/00* (2019.01); *G06Q 30/0201* (2013.01)

(58) Field of Classification Search
CPC ........ G06N 3/0445; G06N 20/00; G06N 3/08; H04L 63/1433; G06F 13/4213
See application file for complete search history.

(56) References Cited

U.S. PATENT DOCUMENTS

2017/0076198 A1* 3/2017 Jin ........................... G06N 3/08
2017/0161640 A1* 6/2017 Shamir ................. G06N 20/00
(Continued)

OTHER PUBLICATIONS

Qiang Yang et al., "Federated Machine Learning: Concept and Applications", aiXiv:1902.04885v1,Feb. 13, 2019, total 19 pages.
(Continued)

*Primary Examiner* — Saba Dagnew

(57) ABSTRACT

A machine learning model is learned using secure vertical federated learning by receiving, by a network machine learning model, from a plurality of private machine learning models, a set of private machine learning model outputs. The set of private machine learning model outputs is based on data owned exclusively by each of the plurality of private machine learning models. The set of private machine learning model machine learning outputs is aligned based on sample IDs of the data. The network machine learning model, a prediction, the prediction being the output of the network model based on the set of private machine learning model outputs. Transmitting, by the network model, the prediction, to one of the plurality of private machine learning models, the one of the plurality of private machine learning models comprising labels. Receiving, by the network model, from the one of the plurality of private machine learning models, a loss based on the labels and the prediction, and calculating a gradient based on the loss, and updating a parameter of the network model based on the loss.

20 Claims, 13 Drawing Sheets

(56) References Cited

U.S. PATENT DOCUMENTS

| | | | | |
|---|---|---|---|---|
| 2017/0223036 | A1* | 8/2017 | Muddu | G06V 10/225 |
| 2017/0293857 | A1* | 10/2017 | Stajner | G01C 21/3617 |
| 2019/0108417 | A1 | 4/2019 | Talagala et al. | |
| 2019/0171978 | A1 | 6/2019 | Bonawitz | |
| 2019/0220703 | A1 | 7/2019 | Prakash et al. | |
| 2019/0227980 | A1 | 7/2019 | McMahan et al. | |
| 2019/0332938 | A1* | 10/2019 | Gendron-Bellemare | G06N 3/08 |
| 2019/0385043 | A1* | 12/2019 | Choudhary | G06F 13/4213 |

OTHER PUBLICATIONS

Otkrist Gupta et al., "Distributed learning of deep neural network over multiple agents", aiXiv:1810.06060v1,Oct. 14, 2018, total 21 pages.

Yang et al., Federated machine learning: Concept and applications, ACM Transactions on Intelligent Systems and Technology (TIST), Feb. 2019, 10(2):12, 19 pages.

Mohassel et al., SecureML: A System for Scalable Privacy-Preserving Machine Learning, IEEE Symposium on Security and Privacy (SP), 2017, 19-38.

Konečný et al., Federated Optimization: Distributed Machine Learning for On-Device Intelligence, arXiv preprint arXiv:1610.02527, Oct. 2016, 38 pages.

Zhao et al., Federated Learning with Non-IID Data, arXiv preprint arXiv:1806.00582, 2018, 13 pages.

Bonawitz et al., Practical Secure Aggregation for Privacy-Preserving Machine Learning, ACM SIGSAC Conference on Computer and Communications Security (CCS), Oct. 30-Nov. 3, 2017, p. 1175-1191.

Shokri et al., Privacy-Preserving Deep Learning, ACM SIGSAC Conference on Computer and Communications Security (CCS), 2015, p. 1310-1321.

Phong et al., Privacy-Preserving Deep Learning via Additively Homomorphic Encryption, IEEE Transactions on Information Forensics and Security, 2018, 13(5), p. 1333-1345.

Du et al., Privacy-Preserving Cooperative Statistical Analysis, IEEE Computer Security Applications Conference (ACSAC), 2001, p. 102-110.

Vaidya et al., Privacy Preserving Association Rule Mining in Vertically Partitioned Data, ACM SIGKDD International Conference on Knowledge Discovery and Data Mining (KDD), 2002, p. 639-644.

Rouhani et al., Deepsecure: Scalable Provably-Secure Deep Learning, ACM Design Automation Conference (DAC), 2018, 13 pages.

Du et al., Privacy-Preserving Multivariate Statistical Analysis: Linear Regression and Classification, SIAM International Conference on Data Mining (SDM), 2004, p. 222-233.

Wan et al., Privacy-Preservation for Gradient Descent Methods, ACM SIGKDD International Conference on Knowledge Discovery and Data Mining (KDD), 2007, p. 775-783.

Hardy et al., Private Federated Learning on Vertically Partitioned Data via Entity Resolution and Additively Homomorphic Encryption, arXiv preprint arXiv:1711.10677, 2017, 60 pages.

Nock et al., Entity Resolution and Federated Learning get a Federated Resolution, arXiv preprint arXiv:1803.04035, 2018, 52 pages.

Pan et al., A Survey on Transfer Learning, IEEE Transactions on Knowledge and Data Engineering, 2009, 22(10), 1345-1359.

Mohassel et al., ABY 3: A Mixed Protocol Framework for Machine Learning, ACM SIGSAC Conference on Computer and Communications Security (CCS), Oct. 15-19, 2018, p. 35-52, Toronto, ON, CA.

Hesamifard et al., CryptoDL: Deep Neural Networks over Encrypted Data, arXiv preprint arXiv:1711.05189, 2017, 21 pages.

Hall et al., Secure Multiple Linear Regression Based on Homomorphic Encryption, Journal of Official Statistics, 2011, 27(4), 669.

Giacomelli et al., Privacy-Preserving Ridge Regression with Only Linearly-Homomorphic Encryption, International Conference on Applied Cryptography and Network Security (ACNS), 2018, p. 243-261.

Dwork, C., Differential Privacy: A Survey of Results, International Conference on Theory and Applications of Models of Computation (TAMC), 2008, p. 1-19.

Abadi et al., Deep learning with Differential Privacy, ACM SIGSAC Conference on Computer and Communications Security (CCS), 2016, p. 308-318.

Konečný et al., Federated Learning: Strategies for Improving Communication Efficiency, arXiv preprint arXiv:1610.05492, Oct. 30, 2017.

McMahan et al., Communication-Efficient Learning of Deep Networks from Decentralized Data. arXiv preprint arXiv:1602.05629, Feb. 28, 2017.

Geyer et al., Differentially Private Federated Learning: A Client Level Perspective, arXiv preprint arXiv:1712.07557, Mar. 1, 2018.

Chen et al., Federated Meta-Learning for Recommendation, arXiv preprint arXiv:1802.07876, Feb. 22, 2018.

Gascón et al., Secure Linear Regression on Vertically Partitioned Datasets, IACR Cryptology ePrint Archive, 2016.

Karr et al., Privacy-Preserving Analysis of Vertically Partitioned Data Using Secure Matrix Products, Journal of Official Statistics, vol. 25, No. 1, 2009, pp. 125-138.

Agrawal et al., Privacy-Preserving Data Mining, In ACM SIGMOD International Conference on Management of Data (SIGMOD), (2000) 439-450.

Smith et al., Federated Multi-Task Learning, In Advances in Neural Information Processing Systems (NeurIPS), 31st Conference on Neural Information Processing Systems (NIPS 2017), Long Beach, CA, USA, 4424-4434.

Gascón et al., Privacy-Preserving Distributed Linear Regression on High-Dimensional Data, Proceedings on Privacy Enhancing Technologies, 2017 (4): 345-364.

Stephen Hardy et al., Private federated learning on vertically partitioned data via entity resolution and additively homomorphic encryption, arxiv.org, Cornell University Library, 201 OlinLibrary Cornell University Ithaca, NY 14853, Nov. 29, 2017, XP080841139, 60 pages.

* cited by examiner

METHOD, APPARATUS AND SYSTEM FOR SECURE VERTICAL FEDERATED LEARNING

CROSS-REFERENCE TO RELATED APPLICATIONS

This application claims priority to U.S. Provisional Patent Application No. 62/897,808 entitled METHOD AND SYSTEM FOR SECURE VERTICAL FEDERATED LEARNING filed Sep. 9, 2019, the entire contents of which are incorporated herein by reference.

FIELD OF THE INVENTION

The present invention pertains to the field of machine learning and in particular to a method and system for performing secure vertical federated learning to train a machine learning model using a supervised learning algorithm and a training data set having samples that are distributed among a number of different parties.

BACKGROUND

A machine learning model is a computerized representation of a real-world process. To train a machine learning model, data (called training data) are collected and a machine learning algorithm is executed to learn the parameters (e.g., weights and biases) of the machine learning model. For many real-world applications, there is only a limited amount data is available, or the data is of low quality, which makes the training of a machine learning model difficult.

Integrating data obtained from multiple owners of data (i.e. data owners) is one way to obtain sufficient data (i.e. training data) for training a machine learning model. However, due to ever growing concerns and restrictions on data sharing and privacy, such as the General Data Protection Regulation (GDPR) of Europe and the Cyber Security Law of China, it is difficult, if not impossible, to transfer, merge and fuse data obtained from different data owners. Many data owners are corporations; however, these corporations consider their data to be a corporate asset that is not to be shared. Corporations are often reluctant to share their data with corporate rivals or third parties due to concerns of having the data copied or of helping a competitor.

As a result, there is a difficulty when a large amount of data is fragmented and isolated among different data owners. Restrictions on data sharing and privacy make it difficult to transfer, merge, or fuse data samples obtained from different data owners at a common site. One such difficulty relates to generating a sufficiently large data set of training data (called training data set) for effectively training an associated machine learning model.

Therefore there exists a need to legally and effectively use data obtained from fragmented and isolated data owners to train a machine learning model while preserving the privacy, confidentiality, and security of the data.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention provide for methods, computing device and system for secure vertical federated learning (SVFL) and subsequent operation of the SVFL system. Security is provided by allowing data owners to securely keep their data private. Vertically federated learning is a class of machine learning that involves training a machine learning model using a supervised learning algorithm and samples of data from multiple data owners, and in which different data owners can have the same or overlapping data sample sets but record different sets of features for at least one of the data samples in these data sample sets. Various learning operations, described below according to embodiments of the present invention, can be performed iteratively and in their proper turn by centralized and private machine learning models, or corresponding computing apparatuses. Learning operations are performed by computing systems of different data owners, along with a (e.g. cloud-based) server. Each data owner may be associated with one or more virtual or physical machines that execute a learning algorithm to learn parameters of a model during training of the model. The server may also include one or more such machines. Subsequent operation of a trained (via machine learning) computing systems and servers are also provided for. This operation is also performed in a vertically federated manner which maintains privacy of data and model parameters.

Embodiments of the present invention provide for a method for secure vertical federated learning of a machine learning model, which may be a central machine learning model or a private machine learning model. The method includes receiving a set of outputs by a server operating a central machine learning model. The set of outputs are received from each of a plurality of computing systems each operating a different respective one of a plurality of private machine learning models. Different ones of the plurality of computing systems transmit different respective ones of the set of outputs generated based on different respective portions of an identified data sample. The set of outputs are aligned based on a sample ID identifying said data sample. The method further includes providing, by the server, a prediction computed by the central machine learning model based on the set of outputs. The method further includes receiving, at the server, a loss, the loss computed based on a comparison of the prediction with a label corresponding to the data sample. The method further includes initiating updating of current model parameters of the machine learning model based on the loss. This may include updating the central machine learning model by the server, or transmitting a message to another computing device, the message indicating the loss or a gradient thereof, and the message causing the updating to occur at the other computing device.

In some embodiments, the method includes computing, by the server, a gradient of the loss relative to model parameters of the central machine learning model. Updating the current model parameters of the machine learning model being trained is then based directly or indirectly on said gradient of the loss. Updating based indirectly on the gradient may include computing a further gradient using a chain rule of derivatives, and updating based on the further gradient.

In some embodiments, providing the prediction comprises transmitting the prediction to a designated computing system (e.g. corresponding to a task owner) of the plurality of computing systems. In particular, the designated computing system holds the label. The loss is computed by the designated computing system, and receiving the loss comprises receiving the loss from the designated computing system.

In some embodiments, providing the prediction comprises providing the prediction to a training function of the server.

The training function holds the label, and receiving the loss comprises receiving the loss from the training function. In such embodiments the method further includes: prior to said receiving the prediction, receiving, by the server from a designated computing system of the computing systems, the label and storing the label in a memory accessible to the server; and computing the loss using the training function.

In some embodiments, the machine learning model being trained is the central machine learning model, and the method further comprises, by the server, updating said current model parameters of the central machine learning model based on the loss.

In other embodiments, the machine learning model being trained is one of the plurality of private machine learning models, and initiating updating of current model parameters of the machine learning model being trained comprises transmitting, by the server, an indication of the loss or an indication of a gradient of the loss to a computing system operating one of the plurality of private machine learning models.

In some embodiments, said gradient of the loss is a gradient relative to model parameters of the central machine learning model. In such embodiments, updating the current model parameters of said one of the private machine learning models is based directly or a gradient of the loss relative to the current model parameters, said gradient of the loss relative to the current model parameters computed from said gradient relative to model parameters of the central machine learning model using a computation implementing a chain rule of derivatives.

In various embodiments, the method further comprises repeating said method of training until a convergence condition is reached.

Embodiments of the present invention provide for a server comprising a computer processor operatively coupled to memory, and a communication interface. The server operates a central machine learning model. The server is configured to receive, from each of a plurality of computing systems each operating a different respective one of a plurality of private machine learning models: a set of outputs of the private machine learning models, wherein different ones of the plurality of computing systems transmit different respective ones of the set of outputs generated based on different respective portions of an identified data sample, the set of outputs being aligned based on a sample ID identifying said data sample. The server is further configured to provide a prediction computed by the central machine learning model based on the set of outputs. The server is configured to receive a loss computed based on a comparison of the prediction with a label corresponding to the data sample. The server is further configured to initiate updating of current model parameters of the machine learning model being trained based on the loss.

According to various embodiments, the server can be configured to operate in accordance with various embodiments of the method already described above.

Embodiments of the present invention provide for a method for training a machine learning model. The method includes transmitting, by a first computing system operating a designated private machine learning model (e.g. of a task owner), to a server operating a central machine learning model: a sample ID; and an output of the designated private machine learning model. The output is generated based on a portion of a data sample identified by the sample ID. Each of a plurality of computing systems, including the first computing system, operates a different respective one of a plurality of private machine learning models including the designated private machine learning model. Each of the plurality of computing systems transmits a different respective one of a set of private machine learning model outputs, including the output. Each one of the set of outputs is generated based on different respective portions of the data sample, and the set of outputs are aligned based on the sample ID. The method further includes receiving, by the computing system from the server, a prediction computed by the central machine learning model based on the set of outputs in combination. The method further includes providing, by the computing system to the server, a loss. The loss is computed based on a comparison of the prediction with a label corresponding to the data sample. The label may be held in memory privately accessible by the first computing system and inaccessible by the server and other ones of said plurality of computing systems. Updating of current model parameters of the machine learning model being trained is subsequently initiated based on the loss.

According to various embodiments of the above method, the machine learning model being trained is the central machine learning model or one of the plurality of private machine learning models.

According to various embodiments of the above method, said updating of the current model parameters of the machine learning model being trained is performed based on a computed gradient of the loss relative to model parameters of the machine learning model being trained.

According to various embodiments of the above method, each of the plurality of computing systems operating the comprises a respective private data storage, each respective private data storage: accessible by a corresponding one of the plurality of computing systems and inaccessible by the server and other ones of the plurality of computing systems; and holding a corresponding one of the different respective portions of the data sample.

Embodiments of the present invention provide for combinations of methods, including methods performed by a server operating a central machine learning model and one or computing systems operating private machine learning models. Embodiments of the present invention provide for apparatuses, such as computing systems or servers, or systems of such apparatuses, which are configured to operate in accordance with one or more of the methods as described above. Each private machine learning model is operated using a corresponding (private) computing system. The central machine learning model is operated using a corresponding (e.g. cloud-based) server. Embodiments of the present invention also provide for a computer program product comprising a (e.g. non-transitory) computer readable medium having statements and instructions recorded thereon. When the statements and instructions are performed by a computer or multiple computers, the corresponding computer or computers implement one or more of the methods as described above.

Potential technical effects of embodiments of the invention are as follows. Machine learning can be performed based on data from multiple entities (data owners), without the necessity for data owners to share their data either in encrypted or unencrypted form. Secure, accurate and efficient general machine learning can potentially be supported. Data owners do not need to send out their private data or their machine learning model parameters. Although machine learning model outputs may be shared, this is not considered to constitute sharing of private data. Approximations are not necessary, encryption is not necessary, and the approach is compatible with a variety of machine learning models.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
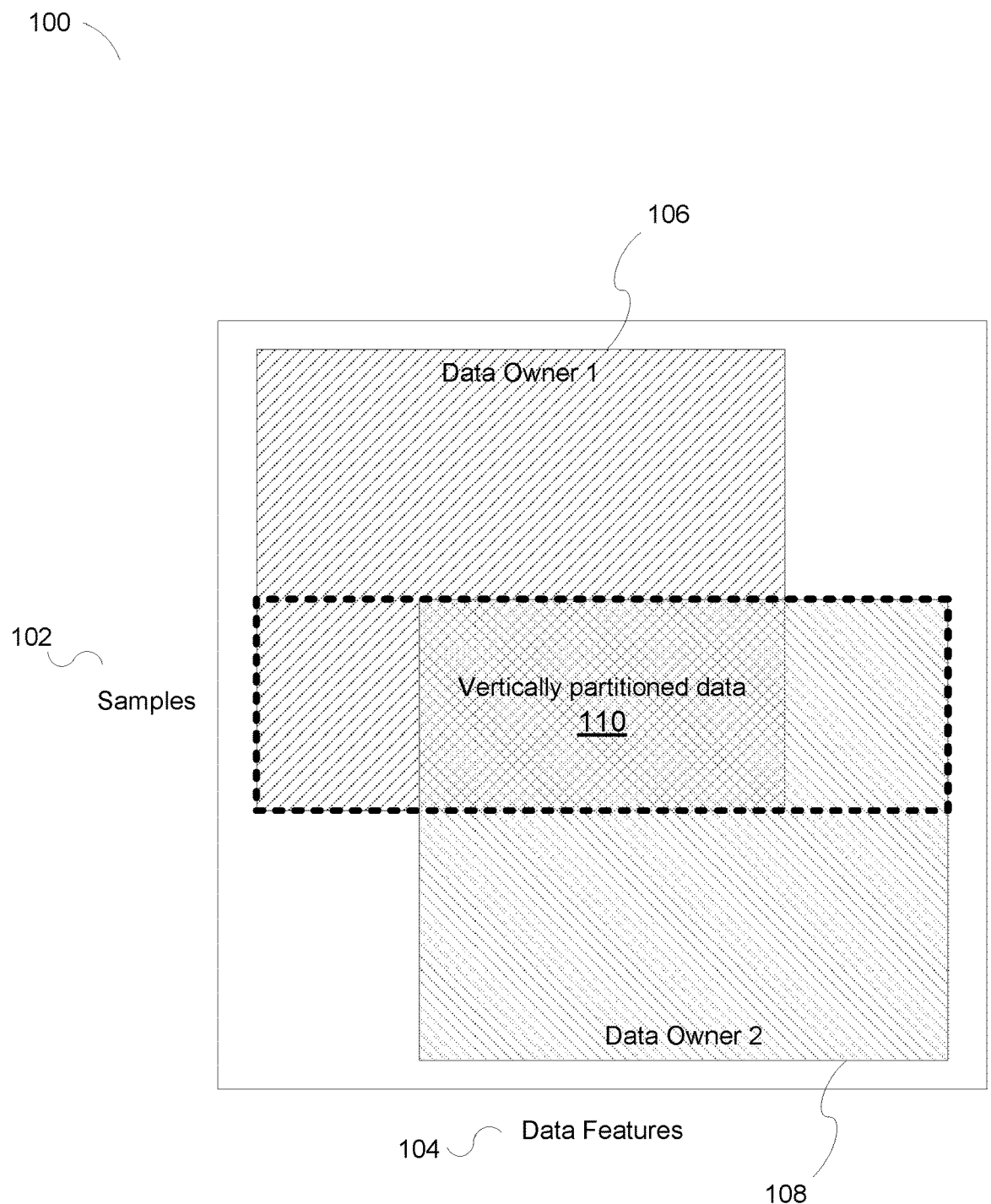
FIG. 1 illustrates vertically partitioned data for two data owners, to be subjected to vertical federated learning, according to an example embodiment of the present invention.

Embodiments of the invention provide Secure Vertical Federated Learning (SVFL) methods and systems to securely train private machine learning models for a supervised machine learning task. The training is performed using the private data owned and stored by multiple data owners. Data owners operate computing systems which interact with a central machine learning model, which is operated on a central server. The training also uses a central machine learning model for the supervised machine learning task, without infringing the data privacy and model privacy of any of these data owners. Model privacy refers to privacy of the structure and parameters of used by a private data owner to represent data for use. The use of data may include, for example, use of the data to generate a private machine learning model, to generate inferences or predictions using the private machine learning model based on observations (i.e., new data samples) input to the model, or a combination thereof.

As used herein, the term "data sample" refers to stored data that refers to a particular entity, such as a person, object, or other identifiable entity having characteristics which can be observed and recorded as data. Each data sample can be identified using a corresponding sample ID. A data sample set refers to a plurality of different data samples. A data sample can have multiple data features (or simply "features") which describe different attributes of the corresponding entity. For example, different data features may relate to different financial, social, or behavioural data for a person. If the data sample is represented as a vector, the data features might be represented as components of the vector. In various embodiments, for training purposes, it is not necessary to sample from a data sample set. Rather, it may be assumed that a data sample set is sampled from a latent distribution of all data.

Generally, according to embodiments of the present invention, a central (shared) machine learning model on a central server is first trained by interacting with computing systems of data owners. After the central machine learning model is sufficiently trained (e.g. to convergence), the private machine learning models operating on the computing systems of each data owner are trained, e.g. in turn. The process of training the central machine learning model and then the private machine learning models can then be repeated iteratively until sufficient training (e.g. convergence) is achieved. For example, in an outer loop, the central machine learning model is trained, the private machine learning models are each trained in turn, and the process repeats until convergence. One or more inner loops can occur. In each inner loop, the central machine learning model, or one of the private machine learning models is trained.

In various embodiments, the interactions that occur during training of the central machine learning model includes providing outputs from the private machine learning models to the central machine learning model, providing a current prediction of the central machine learning model to a computing system of a task owner based on the outputs, and providing a loss (feedback indicative of prediction performance) from the computing system of the task owner back to the central machine learning model. The task owner may provide the loss based on labels held thereby. The task owner is also referred to herein as a designated owner, and the computing system of the task owner (e.g. the computing system operating the private machine learning model of the task owner) is also referred to as a designated computing system.

It should be understood that, here and elsewhere, operating a machine learning model and communicating between different machine learning models involves operating computing systems of private machine learning model (e.g. computing system of task owner or computing system of data owner), operating a central server, or a combination thereof.

In various embodiments, the interactions that occur during training of a private machine learning model can include providing outputs from the private machine learning models to the central machine learning model, providing a current prediction from the central machine learning model to a computing system of a task owner based on the outputs, providing a loss from the computing system of the task owner back to the central machine learning model, providing a gradient of the loss to the private machine learning model being trained, and providing an updated output from the private machine learning model being trained to the central machine learning model. The updated output is generated after adjusting the model parameters of the private machine learning model being trained.

Following training, the machine learning models can be used for example to make predictions. A computing system of a task owner (e.g. a private data owner) sends an output from its private machine learning model to the central server (i.e. central machine learning model). The output is based on its portion of a sample for which the prediction is required. The sample ID is also provided. Next, a collaboration is performed in which each computing system of each data owner provides its own machine learning model output for its own portion of the same sample. (Recall that computing systems of different data owners have different features for the same sample). The outputs of the machine learning models are provided to the central machine learning model. The central machine learning model then generates a prediction, which is the output of the central machine learning model generated based on the outputs of the private machine learning models. The prediction of the central machine learning model is provided to the computing system of the task owner, which makes a final prediction based on same.

In some embodiments, each private machine learning model can be viewed as a feature extractor. The central machine learning model then concatenates the features (e.g. feature maps) provided by these private machine learning models and feeds the concatenated feature maps into its own model. The term "feature" in this paragraph may be distinguished from the term as it is used elsewhere herein.

A variety of terms are used herein should be interpreted generally in the context of machine learning. For example, machine learning models, parameters, predictions, losses, loss functions, labels, samples, features, etc. may all be interpreted as machine learning terms as they would be readily understood by a worker skilled in the art, for example with reference to Bishop, Christopher M., "Pattern Recognition and Machine Learning," Springer, 2006.

For example, labels may refer to a value of some prediction being made by the machine learning models. In some cases, some data may be labelled a priori, for example in the case of supervised machine learning. This may be the case for training data in the case of supervised machine learning. The prediction output by a machine learning model can be compared to such labels, and the error between the two can be quantified as a loss which is fed back to the machine learning model. The label may be interpreted as the ground truth prediction result of a data sample. Labels may be stored locally, in the cloud, or both.

According to various embodiments, it is not necessary to share for each data owner to share its data with other parties, including other data owners. Similarly, a data owner does not necessarily share parameters (i.e. weights and biases) of its own machine learning model with other parties. Approximation is not necessarily used in calculations. Because proprietary data is not shared, encryption is not necessarily required and communication may be done using unencrypted or plain text data.

Some embodiments focus on the general scenario of vertically partitioned data, where different data owners privately own and store different sets of features of the same set of data samples. An illustrative example is smart retailing, where a retailer (e.g., Amazon®) can significantly improve the performance of personalized product recommendation by using the financial data from a bank (e.g., TD Bank®) and the social relation data from a social network company (e.g., Facebook®). Similarly, the bank might be able to significantly improve the accuracy of credit score evaluations by using the purchasing data from the retailer and the social relationship data from the social network company. The social network company might be able to push user interested content more accurately by analyzing the financial data from the bank and the purchasing data from the retailer. Sharing of data between data owners can therefore potentially improve performance of systems at each data owner. However, none of the data owners, such as the retailer, the bank and the social network company, would like to reveal their private data or private machine learning models.

A system of vertical federated learning can be viewed as having N data owners $\{F_1, F_2, \ldots, F_N\}$, any of which may wish to train a machine learning model by consolidating their data and data from other data owners to train the machine learning model. The data is represented by $\{D_1, D_2, \ldots, D_N\}$, where $D_i$ represents the data of data owner $F_i$. If all data were to be freely shared between the N data owners, they would be able to collectively train a machine learning model $M_{SUM}$. That is, $M_{SUM}$ would be trained using $D_1 \cup D_2 \cup \ldots \cup D_N$. Embodiments of the present invention instead provide a vertical federated learning method in which the computing systems of data owners collaboratively train a machine learning model, $M_{FED}$, such that, during the training, the data $D_i$ of any data owner $F_i$ is not exposed to other data owners $F_k$, $k \neq i$. In addition, according to various embodiments of the present invention, the accuracy of $M_{FED}$, denoted as $V_{FED}$, may be sufficiently close to the accuracy $V_{SUM}$ of the hypothetical fully collaborative machine learning model (i.e. the model learned when collectively training the model using all data which is freely shared) $M_{SUM}$. More formally, let $\delta$ be a non-negative real number. When the loss in accuracy between the machine learning model learned using federated learning ("the federated learning model"), $M_{FED}$, and the hypothetical fully collaborative machine learning model, $M_{SUM}$, be expressed as:

$$|V_{FED} - V_{SUM}| < \delta.$$

Then it can be said that the federated learning model has a $\delta$-accuracy loss relative to the fully collaborative model, which is used as a benchmark.

FIG. 1 illustrates vertically partitioning of data for vertically federated learning, according to an embodiment of the present invention. FIG. 1 illustrates data 100, $\{D_1, D_2, \ldots, D_N\}$, owned by a number of data owners, $\{F_1, F_2, \ldots, F_N\}$. In this case, the number of data owners is N=2, for illustrative purposes. Each data set may be viewed as having a number of data samples 102 as shown vertically. Each data sample may have a number of data features 104. For example, each data sample may correspond to a person. An online retailer will have data related to personalized product recommendations for their users, and different data entries can be represented as data features for different people (data samples). Similarly, a bank will have financial data of their users, such as credit scores. A social media company will have social relation data of their users. In cases where the same person (data sample) has data (features) accessible to several or all of the data owners, different data owners will have different data features for the same data samples.

As illustrated in FIG. 1, data owner 1 owns data 106 corresponding to a number of their users (persons) and data owner 2 owns data 108 corresponding to a number of their users. The vertical span of box 110 represents the persons (data samples) for which both data owners 1 and 2 own data. However, data owner 1 owns different (possibly overlapping) data features for these common persons than data owner 2 does. The box 110 represents the data features collectively owned by both data owners for the common persons. When the box 110 is roughly as shown, data is vertically partitioned, and vertical federated learning as described herein may be used. According to vertical partitioning, different data sets $\{D_1, D_2, \ldots, D_N\}$ contain different subsets of features of the same set of data samples. The subsets of features contained in $\{D_1, D_2, \ldots, D_N\}$ may or may not overlap with each other.

In order to identify and align data samples for which multiple different data owners may have data, a unique sample ID or key may be used to identify each data sample. e In the case of a person, the sample ID may be, but is not necessarily limited to, name, birth date, age, address, government ID number, or a combination of the data, that allows the data for a person to be combined from a plurality of data sources.

Figure 2:
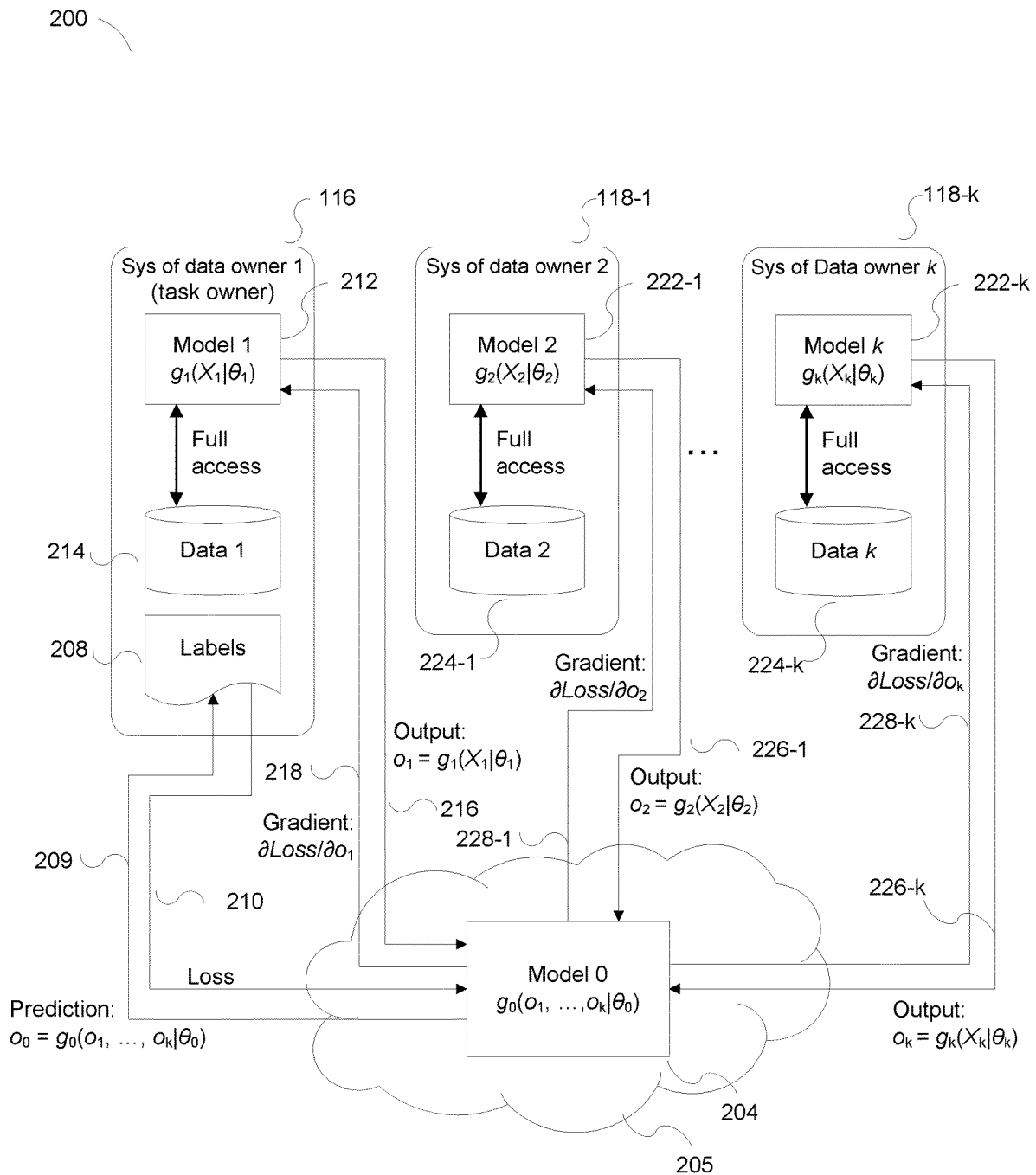
FIG. 2 illustrates a Secure Vertical Federated Learning (SVFL) system for training a machine learning model for a particular task using supervised learning algorithm, according to an embodiment of the present invention.

FIG. 2 illustrates a SVFL system 200 for training machine learning models for a particular task T according to one embodiment of the present disclosure. During a training phase, the SVFL system 200 learns private machine learning models for the task T and further learns a central machine learning model for the task T. The SVFL system 200 includes a computing system 116 of a task owner and computing systems 118-1, . . . . , 118-$k$ of several data owners, interacting with a central machine learning model 204, which may reside in a central server 205 operating in the cloud (e.g. at a datacenter) or another location. There are an arbitrary number k of data owners, with only computing systems of three data owners 1, 2, and k illustrated and labelled in FIG. 2. (For consolidation with FIG. 1, computing system 116 may be considered as corresponding to a data owner (and task owner) owning data 106 and computing system 118 may be considered as corresponding to a data owner owning data 108.) Although the task owner is designated as data owner j=1, it should be understood that this is an arbitrary indexing for illustrative purposes only.

As used herein, the term "cloud" refers to computing resources (i.e., data storage and computing power) that are available on demand and do not reside with any of the data owners. The "cloud" may be a public cloud computing platform such as Amazon AWS, Microsoft Azure, etc., a private cloud, or a hybrid cloud. The computing resources of the "cloud" may include a physical server, a network of services, distributed servers, virtual servers, or other form of networked server and service technology as is known in the art. The servers may be located at, or instantiated using components housed at, a datacenter. The servers comprise computing resources to process and store software (i.e., the software of the central machine learning model) and data, such as the parameters of the central machine learning model, and the outputs of the private machine learning models, the losses of the private machine learning models, and the predictions generated by the central machine learning model, as well as networking infrastructure to communicate with data owners.

The task owner corresponding to computing system 116 is a data owner that privately owns a private machine learning model for a particular task T The task owner privately owns and stores (on the computing system 116) the labels 208 related to the task, T, and it privately defines a loss function for its private machine learning model. The task owner privately owns and stores (on the computing system 116) the private machine learning model related to T and stores its own data set that is used to train its private machine learning model for the task T during a training phase. Prior to training the machine learning model, the task owner initializes the private machine learning model 212 by setting each of the parameters of its private machine learning model to an initial value. In various embodiments, any data owner can become a task owner by initiating a task using the SVFL system 200. Initiating a task can include starting the process staring the SVFL system 200 to train machine learning models for a particular task T, including each of the private machine learning models and the centralized model for the particular task T. For example, initiating a task may include performing the necessary operations for starting the process of training an image classifier. Initiating a task can include defining a task and transmitting a message to at least the central machine learning model, the message triggering of a machine learning operation corresponding to the task. Defining the task may include initialization operations as well as actions of the SVFL system 200 as described herein. A computing system of a data owner can initiate an arbitrary number of tasks and thereby initiate the training of a respective machine learning model for an arbitrary number of tasks. However, in various embodiments it is required that each task only has a single task owner at a time.

As will be readily understood by a worker skilled in the art, a loss function is a function (comparable to a cost function, error function or objective function) that receives a machine learning model's output (e.g. a prediction) and computes a loss which is the output of the loss function computed based on this received output. In supervised learning, each training data includes an input (e.g. training data sample) and an output (the label, which may be a ground truth or expected output). The loss reflects the difference between the machine learning's output (e.g. prediction) and the label. The loss is used in backpropagation to update model parameters of the machine learning model. Various loss functions can be used, such as those that determine mean squared error, hinge loss, cross entropy loss, etc. The appropriate loss function used in training a machine learning model is dependent on the particular task the machine learning model is being trained for.

For data owners 2 to k, each of these k−1 data owners stores their own private data set 224-1, . . . , 224-$k$ on their corresponding computing systems 118-1, . . . , 118-$k$. Each private data set owned and stored by the k−1 data owners are vertically partitioned (e.g. as described generally above with respect to FIG. 1). A computing system of a data owner can train a private machine learning model for as many tasks as it needs, however, it may be required that there is a single task owner at a time for a single task. Each k−1 data owner privately owns and stores a private machine learning model 222-1, . . . , 222-$k$ that is trained, during a training phase, using the private data sampled from the private data set 224-1, . . . , 224-$k$ of that data owner. All data owners use their private data and private machine learning models to interact with a central machine learning model 204 running on the central server 205 in the SVFL system 200. The interaction itself may be carried out for example via the exchange of machine learning outputs, losses, and loss gradients. This is performed in order to achieve an overall machine learning model for the task T without infringing the data privacy and model privacy of any data owner.

A central machine learning model 204 (i.e., Model 0) for the task, T, resides in the central server 205 and is trained during a training phase. The training is performed in order that, once trained, the central machine learning model may be used for prediction during a subsequent inference phase. The trained central machine learning model may be stored in the cloud, e.g. in the central server 205. For security and privacy, private data sets are not stored in the cloud, or anywhere outside of the private storage resources of their respective data owners. The cloud comprises necessary computing resources (i.e., virtual machines and storage) to store the central machine learning model 204 for the task T and to perform training of the central machine learning model 204 for the task T.

In various embodiments, there is no direct connection between computing systems of different data owners. Instead interactions only occur pairwise between the central machine learning model (i.e. the server operating same) and the computing systems of the respective data owners. The interactions between the central machine learning model 204 and the computing system 116 of the task owner may include or consist of:

- The computing system 116 sending the output 216 of its private machine learning model 212 (Model 1) for the task T to the central machine learning model 204 (Model 0) for the task T The output 216 may be a prediction made by the private machine learning model.
- The central machine learning model 204 (Model 0) for the task T sending a gradient 218 of a loss with respect to the output 216 of the private machine learning model 212 (e.g., Model 1) of the task owner to the computing system 116.
- The central machine learning model 204 for the task T sending its prediction 209 generated for the task T to the computing system 116.
- The computing system 116 sending the loss value 210 determined for its private machine learning model 212 (e.g., Model 1) to the central machine learning model 204 for the task T.

The interactions between the central server 205 that hosts the central machine learning model 204 for task T and the computing systems 118-1, . . . , 118-k of the data owners who are not task owners is illustrated for example with respect to computing system 118-1 of data owner 2 and includes or consists of:

- The computing system 118-1 sending the output 226-1 of its private machine learning model 222-1 (e.g., Model 2) for the task T to the central machine learning model 204 (e.g., Model 0) for the task T. The output 216-1 may be a prediction made by the private machine learning model.
- The central machine learning model 204 (e.g., Model 0) for the task T sending the gradient of the loss 228 with respect to the output 226-1 of the private machine learning model 222-1 (e.g., Model 2) of the data owner 2 to the computing system 118-1.

Specific notations may be used to explain the process used by embodiments of the SVFL system 200. Some of these notations are as follows:

- $X_j$, $j \in \{1, \ldots, k\}$ represents the set of training data (called training data set) of the computing system of data owner j. Training data set can include some or all of the data collected by the computing system of data owner j and stored in storage by the computing system of data owner j, including some or all features of said data samples. Training data refers to data that is used particular for training machine learning models. As mentioned above, features may refer to parts of data samples, where computing systems of different data owners may store different features for the same data sample in the case of vertically partitioned data.
- If full-batch training for the SVFL method is applied, $X_j$ represents the set of all training data held by the computing system of data owner j. Full-batch training refers to cases where all available data is used to train the machine learning models.
- If stochastic training methods are applied during training of the SVFL system 200, $X_j$ can represent a set of randomly sampled training data samples owned and stored by the computing system of data owner j. Stochastic training refers to cases where a random subset of all available data is used to train machine learning models.
- All the data samples in $X_1, \ldots, X_k$ are aligned using unique sample IDs. The sample IDs are assumed to be consistent across computing systems of data owners. That is, if two computing systems have two respective data entries for the same sample (e.g. person), the two data entries are indexed using the same sample ID.
- $\theta_j, j \in \{1, \ldots, k\}$ represents the set of parameters of the private machine learning model (e.g., 212, 222-1, . . . , 222-k) j of the computing system of data owner j. The set of parameters of each private machine learning model j include internal variables which may be learned during a training) phase of the private machine learning model j.
- $g_j(X_j|\theta_j), j \in \{1, \ldots, k\}$ represents the private machine learning model (e.g., 212, 222-1, . . . , 222-k) of computing system of data owner j.
- $o_j = g_j(X_j|\theta_j), j \in \{1, \ldots, k\}$ represents the output (e.g., 216, 226-1, . . . , 226-k) of the private machine learning model j with respect to $X_j$. Machine learning model outputs are configurable depending on task, but typically relate to desired predictions or information which is generated by the model based on inputs provided thereto. Examples of model outputs can be: classification outputs indicative of which class an input belongs to, and regression output indicative of a predicted outcome variable based on one or more inputs. The output $o_j$ can be regarded as an abstracted feature of the input $X_j$, as output by a private machine learning model.
- $\theta_0$ represents the set of parameters of the central machine learning model 204 (e.g., Model 0). The set of parameters of the central machine learning model 204 are learned during a training phase of the SVFL method of the present invention.
- $g_0(o_1, \ldots, o_k|\theta_0)$ represents the central machine learning model 204 (Model 0) stored in the cloud.
- $o_0 = g(o_1, \ldots, o_k|\theta_0)$ represents the output 209 of the central machine learning model 204 (Model 0). Here, $o_0$ also represents the prediction generated by the central machine learning model 204 for the task T.

Figure 3A:
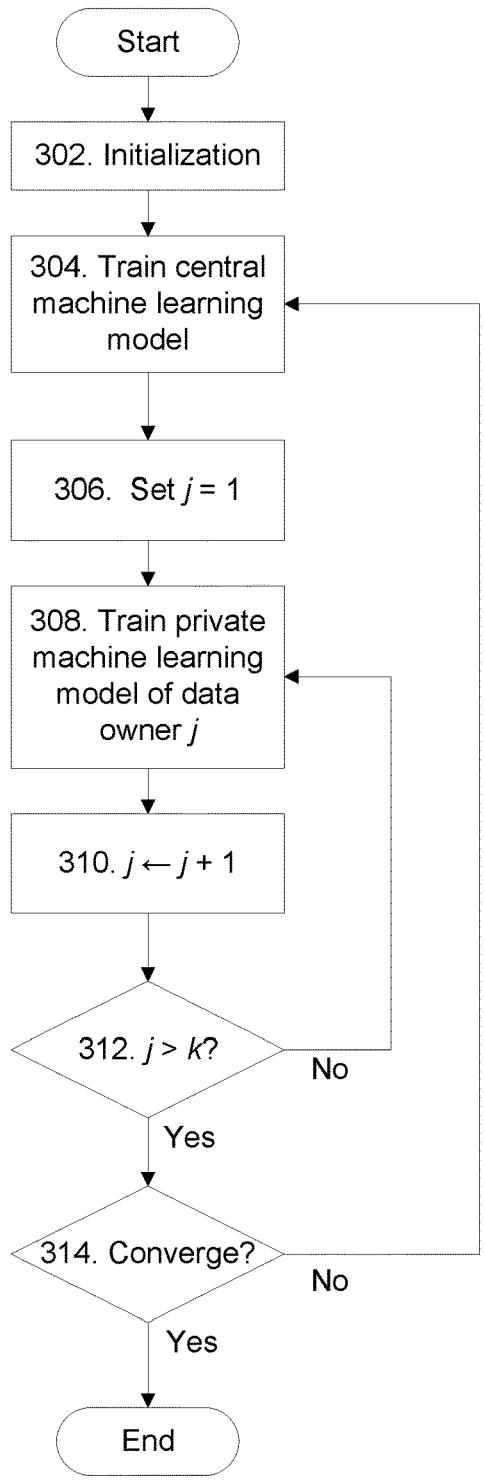
FIG. 3A illustrates a method performed by the SVFL system of FIG. 2 to train the machine learning model for the particular task, according to an embodiment of the present invention.
Figure 3B:
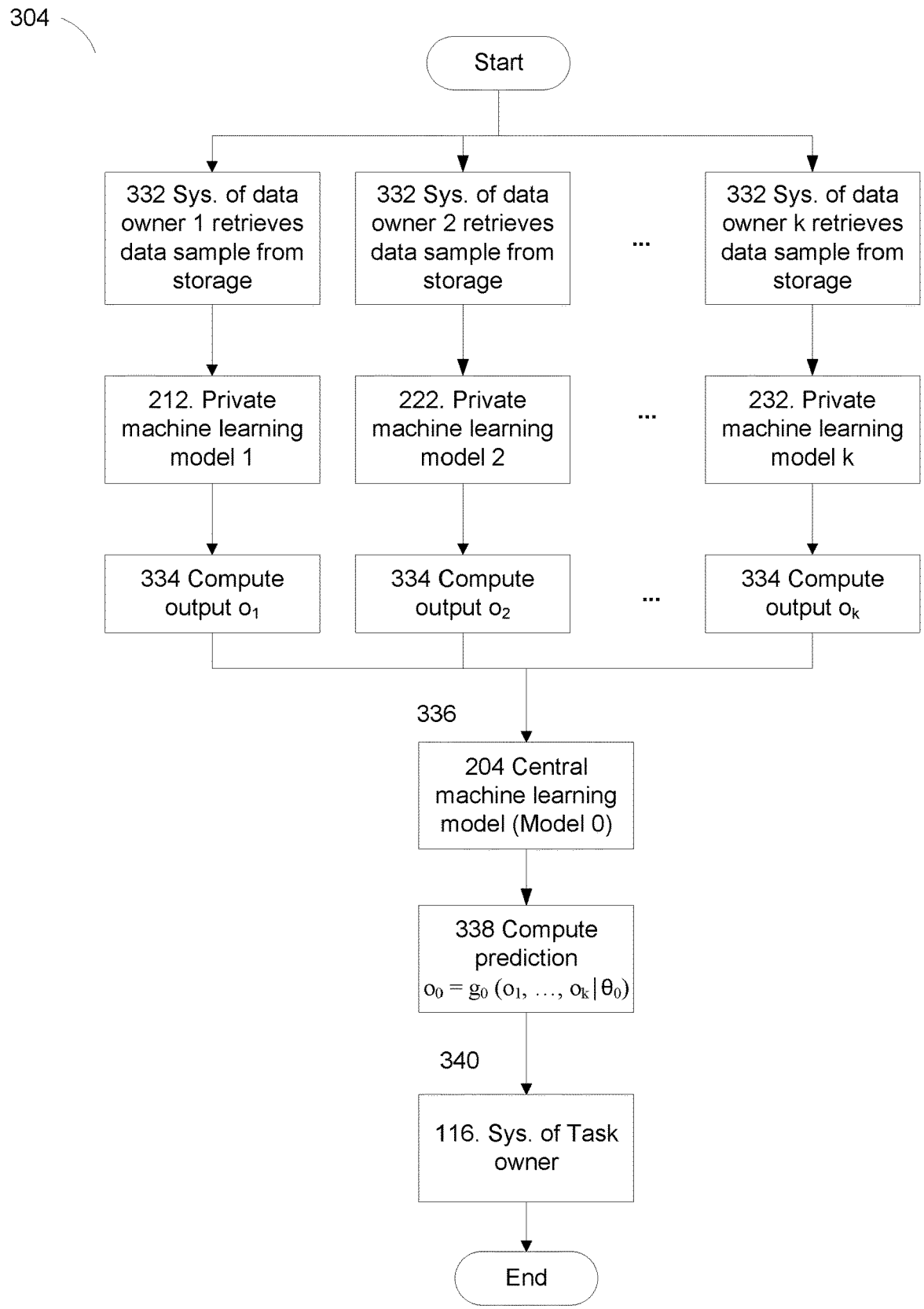
FIG. 3B illustrates further details of the method of FIG. 3A, according to some embodiments of the present invention.

FIGS. 3A and 3B illustrate a method 300 performed by the SVFL system 200 of FIG. 2 according to an embodiment to train the private machine learning models 212,

222-1, ..., 222-k and central machine learning model 204. In step 302 the SVFL system 200 is initialized. Anonymized sample IDs may be generated by the computing system of each data owner j, for example in a consistent manner across data owners. Hashing methods may be used to generate unique hash keys for each sample ID to be used as anonymized sample IDs. If two hash keys are the same, then their corresponding sample ID should be the same. In this way, the computing system of each data owner can compute the hash keys privately by themselves, and only send the hash keys to the cloud. The central machine learning model 204 (e.g., Model 0) collects the anonymized sample IDs from all data owners j and aligns the data samples in $X_1, \ldots, X_k$.

In various embodiments, sample IDs are provided via request/response messaging. As mentioned previously, each sample has a unique sample ID. The sample IDs can be generated for example using hashing techniques. For example, the service card ID number of a person can be a unique ID of that person. In some embodiments, sample IDs can be anonymized using hashing techniques. For example, anonymized service card IDs may be used as sample IDs.

Next, computing system 116 of data owner 1 becomes the task owner by initiating a task T. Computing system 116 of data owner 1 initializes (e.g. randomly) the parameters $\theta_1$ of its private machine learning model 212 (e.g., Model 1), and sends a task initiation request to the central machine learning model 204 (Model 0). Based on the task initiation request received from the task owner, the central server 205 initializes (e.g. randomly) the set of parameters $\theta_0$ of central machine learning model 204 (e.g., Model 0), and broadcasts a task initiation request to the computing systems of data owners 2 to k (e.g., 118-1, ..., 118-k). Based on the task initiation request received from the central machine learning model 204 (e.g., Model 0), each computing system 118-1, ..., 118-k of each data owner 2 to k initializes (e.g. randomly) the parameters of its own private machine learning model 222-1 (e.g., Model 2), ..., 222-k (e.g., Model k). The central server 205 may be provided by a cloud computing platform operating computer equipment (e.g. computing resources), and possibly co-located or integrated with the computer equipment (e.g. computing resources) operating the central machine learning model.

Task initiation requests may be made for example by sending a TCP/IP connection request from the task owner to the central server 205 and sending a predefined message from the task owner to the central server 205, requesting to be recognized as a task owner. At the same time, the task owner may also send a set of anonymized sample IDs to the server, such that the server can further use this set of anonymized sample IDs to coordinate with the other data owners. The task initiation request broadcast from the server to the computing systems of other data owners is similar, however in this case, it is the server that sends a TCP/IP connection request to the computing systems of the other data owners. The server will also send the set of anonymized sample IDs, which was received from the task owner, to the computing systems of other data owners. In this way, the computing systems of data owners will know which set of data is requested for the task.

In step 304, and with reference to FIG. 3B, the central machine learning model 204 (e.g., Model 0) is trained. Each computing system 116, 118-1, ..., 118-k of data owner 1 to k retrieves 332 a batch of data samples from storage that is only accessible by that computing system and provides the retrieved batch of data samples as input to their own private machine learning model (e.g., 212, 222-1, ..., 222-k). Each respective private machine learning model (e.g., 212, 222-1, ..., 222-k) computes 334 an output (e.g. the outputs $o_1, \ldots, o_k$) for such an input data sample. These outputs $o_1, \ldots, o_k$ are sent 336 to the central machine learning model 204 (Model 0) and are used as input to the central machine learning model. Then, based on the outputs $o_1, \ldots, o_k$ received from the computing systems 116, 118-1, ..., 118-k of data owners 1 to k, the central machine learning model 204 (Model 0) computes 338 its prediction $o_0 = g_0(o_1, \ldots, o_k | \theta_0)$ and sends 340 the prediction $o_0$ to the computing system 116 of the task owner (i.e., data owner 1). The prediction $o_0$ is an output of the central machine learning model given 204 its current model parameters $\theta_0$ and in response to the received inputs (which are the outputs $o_1, \ldots, o_k$ of the private machine learning models).

It is noted that the central machine learning model 204 is a model which receives, as its inputs, the outputs $o_1, \ldots, o_k$ of other machine learning models. This is in contrast to the central machine learning model receiving data samples $X_1, \ldots, X_k$ as inputs. That is, the central machine learning model is trained based on outputs of private machine learning models, which maintains privacy of the data of data owners because the data samples are not shared with other data owners. Furthermore, the private machine learning models are trained in coordination with the (at least partially) trained central machine learning model. An interactive iteration of training operations between machine learning models further facilitates the training.

Based on the prediction $o_0$ received from the central machine learning model 204 (Model 0), the computing system 116 of the task owner uses the label associated with the retrieved data sample to compute the loss related to its task T and sends the loss back to the central server 205 running the central machine learning model 204 (e.g., Model 0). Based on the loss computed by the computing system 116, the central server 205 computes the gradient of the loss with respect to its current parameters, denoted $\partial Loss/\partial \theta_0$ and also referred to as "gradient," for the central machine learning model 204 (e.g., Model 0). The central server 205 then uses the gradient to update the parameters $\theta_0$ of the central machine learning model 204 (e.g., Model 0). Step 304 is iterated (e.g. using different samples) until sufficient convergence of the central machine learning model 204 (e.g. Model 0) is achieved.

Updating the parameters $\theta_0$ of the central machine learning model 204 can be performed using various approaches, such as backpropagation, which adjust the parameters $\theta_0$ of the machine learning models according to supervised learning feedback, as would be readily understood by a worker skilled in the art. For example, neural network node weights can be adjusted based on the feedback in a manner that would have made the model generate a prediction that resulted in an improved result, as measured by the feedback (loss).

Sufficient convergence of the central machine learning model 204 can be deemed to be achieved under a number of conditions. In some embodiments, sufficient convergence can occur when the number of iterations exceeds a maximum number of iterations specified by a user or the SVFL system 200. In some embodiments, sufficient convergence can occur when the change of loss between previous and current iterations is smaller than a specified threshold. In some embodiments, sufficient convergence can occur when the 2-norm (Euclidean norm) of the gradient $\partial Loss/\partial \theta_0$ is smaller than a specified threshold. Various other convergence conditions, indicative that the machine learning has approached a steady state or sufficiently optimal condition, can be used.

Following sufficient convergence of the central machine learning model, the method 300 then proceeds to steps 306-312 which comprise training each of the private machine learning models 212, 222-1, . . . , 222-k running on each of the computing systems of private data owners 1 to k (e.g., computing systems 116, 118-1, . . . , 118-k). First, the computing systems 116, 118, . . . , 118-k of private data owners 1 to k retrieve (e.g. batches of) data samples from storage and input the data samples to their own respective private machine learning model. The private machine learning models 212, 222-1, . . . , 222-k are then used separately to compute the outputs $o_1, \ldots, o_k$ based on these retrieved data samples. These outputs $o_1, \ldots, o_k$ are then sent to the central server 205 where they are used as inputs to the central machine learning model. Based on the outputs $o_1, \ldots, o_k$ received from the computing systems 116, 118, 202 of the private data owners 1 to k, the central server 205 stores the outputs as a set $S=\{o_1, \ldots, o_k\}$. Based on the set S, the central machine learning model (Model 0 204) is used to compute a prediction $o_0$.

The prediction $o_0$ provided by the central machine learning model is then sent (by the central server 205) and to the computing system 116 of the task owner. Based on the prediction $o_0$ received from the central server 205 running the central machine learning model 204 (e.g., Model 0), the computing system 116 of the task owner uses its labels 208 to compute the loss related to its task T Then, the computing system 116 of the task owner sends the loss back to the central server 205. Based on the loss received from the computing system 116 of the task owner, the central server 205 that implements (e.g. runs) the central machine learning model (Model 0 204) computes the gradient $\partial Loss/\partial \theta_j$ and the central server 205 sends the computed gradient $\partial Loss/\partial \theta_j$ to the computing system 118-1, . . . , 118-k of the private data owner j. Based on the gradient $\partial Loss/\partial \theta_j$ received from the central server 205, the computing system 118-j of the private data owner j (where j is an integer from 1 to k-1) updates its private machine learning model parameters $\theta_j$, by, for example, performing backpropagation. Then, the computing system 118-j of the private data owner j computes a new output $o_j'$ and sends the new output $o_j'$ to the central server 205. Based on the new output $o_j'$ received from the computing system 118-j of the private data owner j, the central machine learning model 204 (Model 0) updates the set S by replacing $o_j \in S$ with $o_j'$. Updating of the parameters $\theta_j$ corresponds to training of the private machine learning model 222-j of the private data owner j in the current iteration.

In some embodiments, the loss gradient $\partial Loss/\partial \theta_j$ for some j can be computed based on the loss gradient $\partial Loss/\partial \theta_i$ for some $i \neq j$ using the chain rule for derivatives. (It is noted that i or j can equal zero here.) This may involve computationally applying the formula $\partial Loss/\partial \theta_j = \partial Loss/\partial \theta_i * \partial \theta_i / \partial \theta_j$, either exactly or approximately. For example, as mentioned above, based on the loss received from the task owner, the central machine learning model may compute the gradient $\partial Loss/\partial \theta_j$. This computation may involve computing $\partial Loss/\partial \theta_0$ and then applying the chain rule formula to compute $\partial Loss/\partial \theta_j = \partial Loss/\partial \theta_0 * \partial \theta_0 / \partial \theta_j$.

Once the private machine learning model 222-j of private data owner j is trained, the machine learning model 222-j+1 of the next private data owner (j+1) is trained. The above process can repeat until the private machine learning models k for the task owner and all k-1 private data owners have been trained to convergence 314. Convergence of the private machine learning models 212, 222-1, . . . , 222-k can be deemed to be achieved under a number of conditions. Convergence can be deemed to occur when the number of iterations of the learning process exceeds a maximum number of iterations specified by a user or the SVFL system. Convergence can be deemed to occur when the change of loss between previous and current iterations is smaller than a specified threshold. Convergence can be deemed to occur when the 2-norm of the gradient $\partial Loss/\partial \theta_j$, for all $j \in \{0, \ldots, k\}$ is smaller than a specified threshold.

As illustrated in FIG. 3A, the training sequence is as follows. Following training 304 of the central machine learning model to a convergence condition, each private machine learning model is trained in turn by initializing 306 j to one, training 308 the private machine learning model $g_j$ of data owner j, incrementing 310 j, and, if j is not yet greater than k (the number of data owners) as shown in comparison 312, the next private machine learning model $g_j$ of data owner j is trained. This is performed until all k private machine learning models are trained. Then a convergence condition is checked 314. If the convergence condition is satisfied, the training ends, and otherwise the process repeats starting at step 304. Training of each private machine learning model in step 308 can include performing a single training iteration, as already described above.

Although FIG. 3A and the above description specifies a particular sequence of training operations and convergence checks, it should be understood that the training iterations and convergence checks can be varied in many ways. For example, each instance of step 304 can involve a single iteration (or a limited number of iterations) of training the central machine learning model, without necessarily requiring a convergence check as part of step 304. As another example, convergence checks can be performed intermittently or at substantially arbitrary points in the training cycle. As yet another example, rather than training the private machine learning models of data owners in a consistent order, the private machine models can be trained in an arbitrary order. As yet another example, on a given iteration of training the private machine learning models, an arbitrary subset of the private machine learning models can be trained, while others are not necessarily trained on that iteration.

Figure 4:
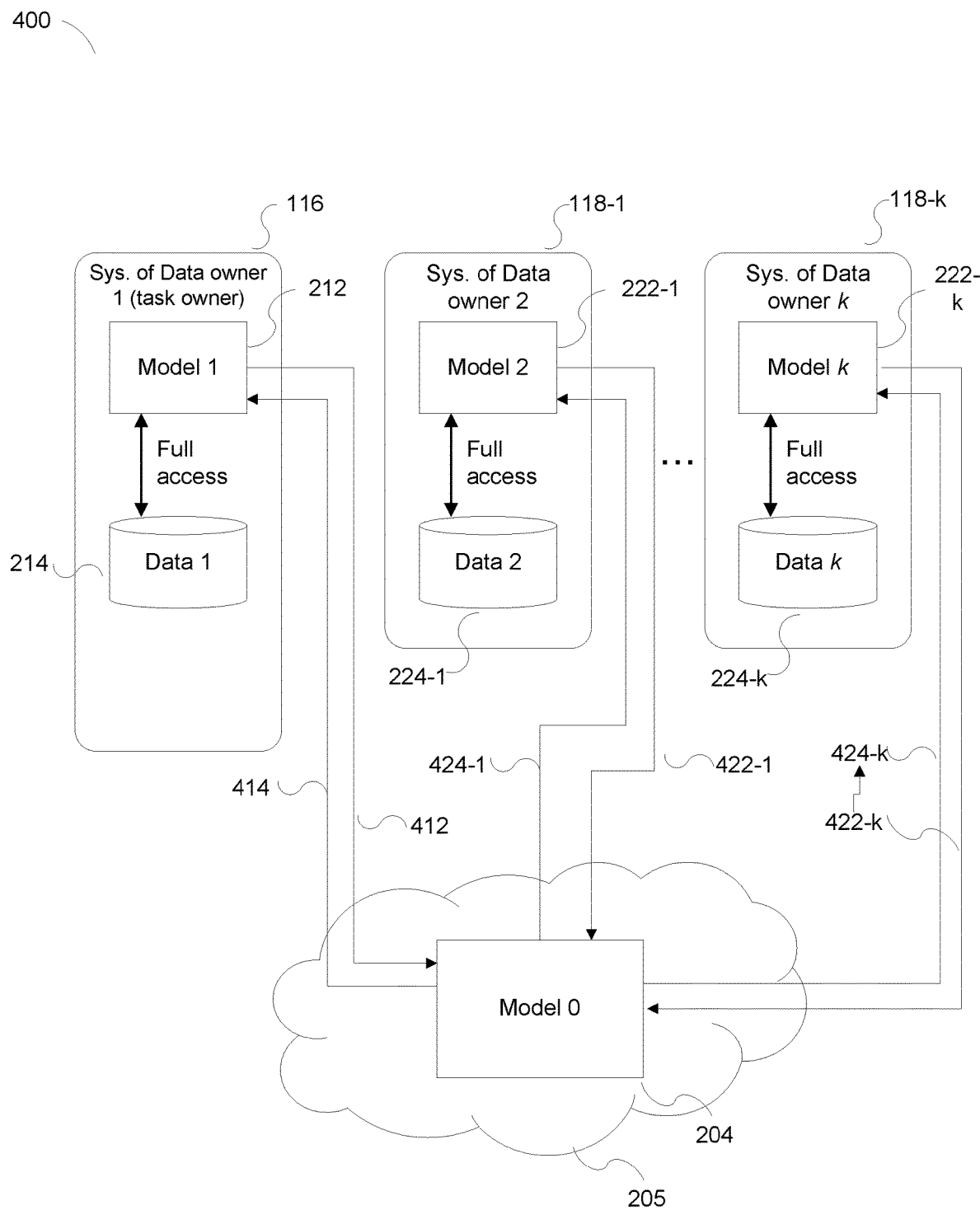
FIG. 4 illustrates a trained SVFL system that can be used to generate predictions on new data, according to an embodiment of the present invention.

FIG. 4 illustrates a SVFL system 400 operating in a trained (e.g. prediction) mode, according to an embodiment of the invention. The SVFL system 400 may be an instance of SVFL system 200 after the system has been trained for example according to the method 300. The SVFL system 400 comprises a computing system 116 of a task owner that includes a trained private machine learning model 212-1 of the task owner (i.e., a private machine learning model trained during execution of the method 300), computing systems 118-1, . . . 118-k of k-1 of the k data owners that each include a trained private machine learning model 222-1, . . . , 222-k (i.e., private machine learning models trained during execution of the method 300) and a trained central machine learning model 204 (i.e., central machine learning model trained during execution of the method 300).

A computing system 116 of the task owner is a computing system of a data owner that initializes and privately owns the task T. In the SVFL system 400, the task owner launches a prediction request for a new data sample and outputs the prediction generated by its private machine learning model 212 based on the new data sample. The task owner owns and stores its own private machine learning model 212 and data set 214.

Each of the computing systems 118-1, . . . , 118-k of the other k-1 data owners stores a private data set 224-1, . . . , 224-k, respectively. The private data sets 224-1, . . . , 224-k owned and stored by the k−1 data owners are vertically partitioned (see FIG. 1). Each data owner privately owns and stores their own trained private machine learning model 222-1, . . . , 222-k. Each private machine learning model can fully access the private data of its data owner. All data owners use their own private data and their own trained private machine learning model to collaborate with the trained central machine learning model, in order to achieve a prediction for the task T.

The trained central machine learning model 204 generates the final prediction for the task T The central machine learning model 204 can be stored and operated in the central server 205, for example. Unlike the computing systems 116, 118-1, . . . , 118-k of task owner and the k−1 data owners, the central server 205 does not necessarily store any of the private data sets of the data owners. Indeed, to ensure privacy and security, it is typically deemed desirable not to store the private data sets in the central server 205 or otherwise in association with the central machine learning model 204.

In various embodiments, there is no direct connection or interaction between computing systems of different data owners. The necessary interactions only occur between computing systems of the private data owners (including the computing system 116 of the task owner) and the central server 205. The interactions between the central server 205 and the computing system 116 of the task owner include the task owner launching a prediction request on a sample by sending the corresponding sample ID to the central server, and the task owner sending its own output with respect to the sample to the central server. The central server, in response, sends the central machine learning model's final prediction for task T to the computing system 116 of the task owner.

The interactions between the central server and the computing systems 118-1, . . . , 118-k of k−1 data owners that are not task owners includes the central server 205 sending the sample ID to each of the computing systems 118-1, . . . , 118-k and each of the computing systems 118, 202 sending its output with respect to the sample ID to the central server.

The notations used in the trained SVFL system 400 are similar to those of the untrained SVFL system 200. However, for clarity, these notations are defined as follows.

$x_{i,j}$ represents the vector of features of a data sample $x_i$ that are stored by the computing system of data owner j.

$i \in \{1, \ldots, n\}$ represents the unique sample ID of data sample $x_i$.

n represents the number of data samples.

$j \in \{1, \ldots, k\}$ represents the index of the $j^{th}$ data owner and its computing system.

k represents the number of data owners and corresponding computing systems.

$\theta_j$ represents the set of learned model parameters for the trained private machine learning model of the data owner j.

$g_j(x_{i,j}|\theta_j)$ represents the trained private machine learning model of the data owner j.

$o_j=g_j(x_{i,j}|\theta_j)$ represents the output of the trained private machine learning model $g_j$ with respect to $x_{i,j}$.

$\theta_0$ represents the set of learned model parameters for the trained central machine learning model 204.

$g_0(o_1, \ldots, o_k|\theta_0)$ represents the trained central machine learning model 204.

$o_0=g(o_1, \ldots, o_k|\theta_0)$ represents the output of the trained central machine learning $g_0$ 204 with respect to $o_1, \ldots, o_k$. Here, $o_0$ also represents the prediction produced by the trained central machine learning 204 of the SVFL system 400.

Using this notation, the prediction method 500 used by SVFL system 400 will now be described.

Figure 5A:
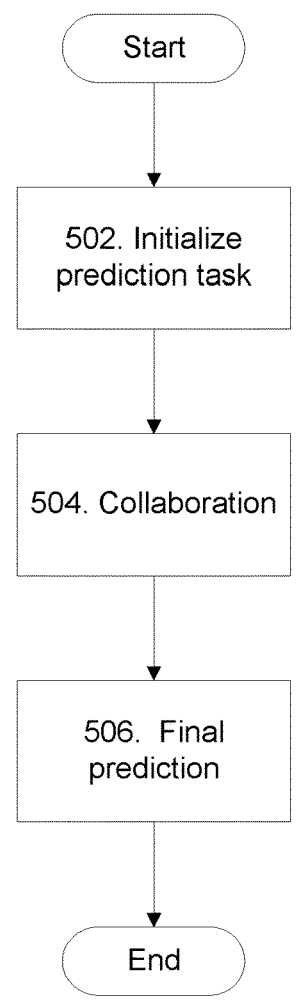
FIG. 5A illustrates a method performed by the trained SVFL system of FIG. 4 to generate predictions, according to an embodiment of the present invention.

FIG. 5A illustrates the steps of the prediction method performed by the embodiment of FIG. 4. The method comprises the following steps. Step 502 initializes the prediction task. As part of the initialization, the computing system 116 of the task owner initiates the prediction method for a data sample $x_i$. The trained private machine learning model $g_1$ of the task owner (assuming for simplicity that task owner j=1) receives the data sample $x_i$ and outputs its prediction $o_1=g_1(x_{i,1}|\theta_1)$ for the data sample $x_i$. The computing system of 116 task owner sends the prediction $\theta_1$ as well as the sample ID i to the central server 205.

Figure 5B:
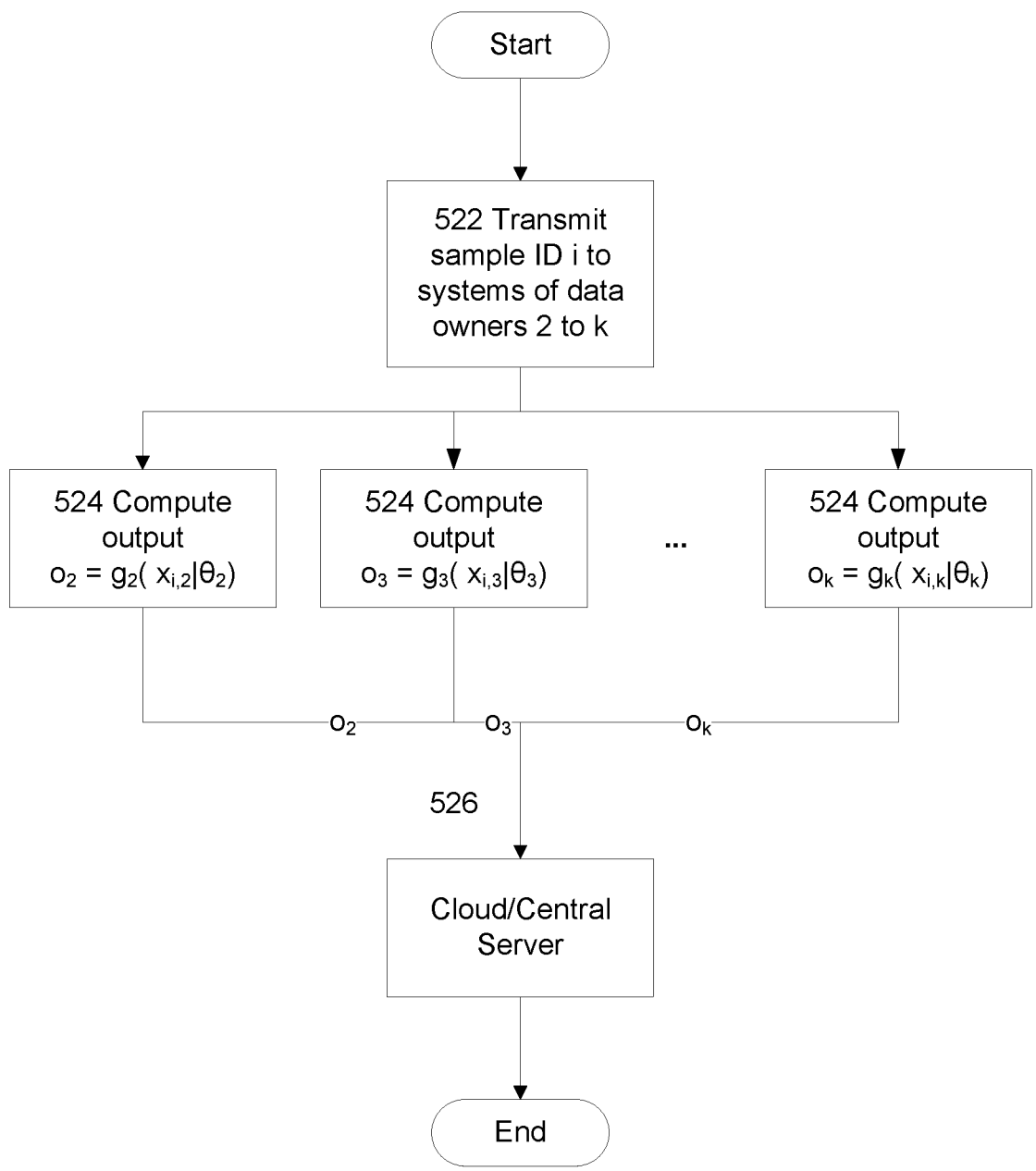
FIG. 5B illustrates further details of the method of FIG. 5A, according to some embodiments of the present invention.

Step 504, an embodiment of which is illustrated in more detail in FIG. 5B, involves the collaboration of the computing systems 118-1, . . . , 118-k of other data owners. Based on the sample ID i from the computing system 116 of the task owner, the central server 205 transmits 522 (e.g. broadcasts) the sample ID i to the computing systems 118-1, . . . , 118-k of data owners 2 to k (i.e. the data owners other than the task owner). The computing system 118-j of each data owner j, $j \in \{2, \ldots, k\}$, computes 524 its output $o_j=g_{i,j}|\theta_j)$ for its trained private machine learning model and sends 526 its output $o_j$ to the central server 205. Based on the outputs $o_1, \ldots, o_k$ of the computing systems 116, 118-1, . . . , 118-k of all data owners 1 to k, the central server uses the trained central machine learning model $g_0$ to compute the prediction $o_0=g_0(o_1, \ldots, o_k|\theta_0)$ The central server sends the computed prediction $o_0$ to the task owner 116. Based on the prediction $o_0$ as received from the central server, the task owner outputs the prediction received from the cloud as the final prediction 506 for the task T, for the data sample $x_i$.

Figure 6:
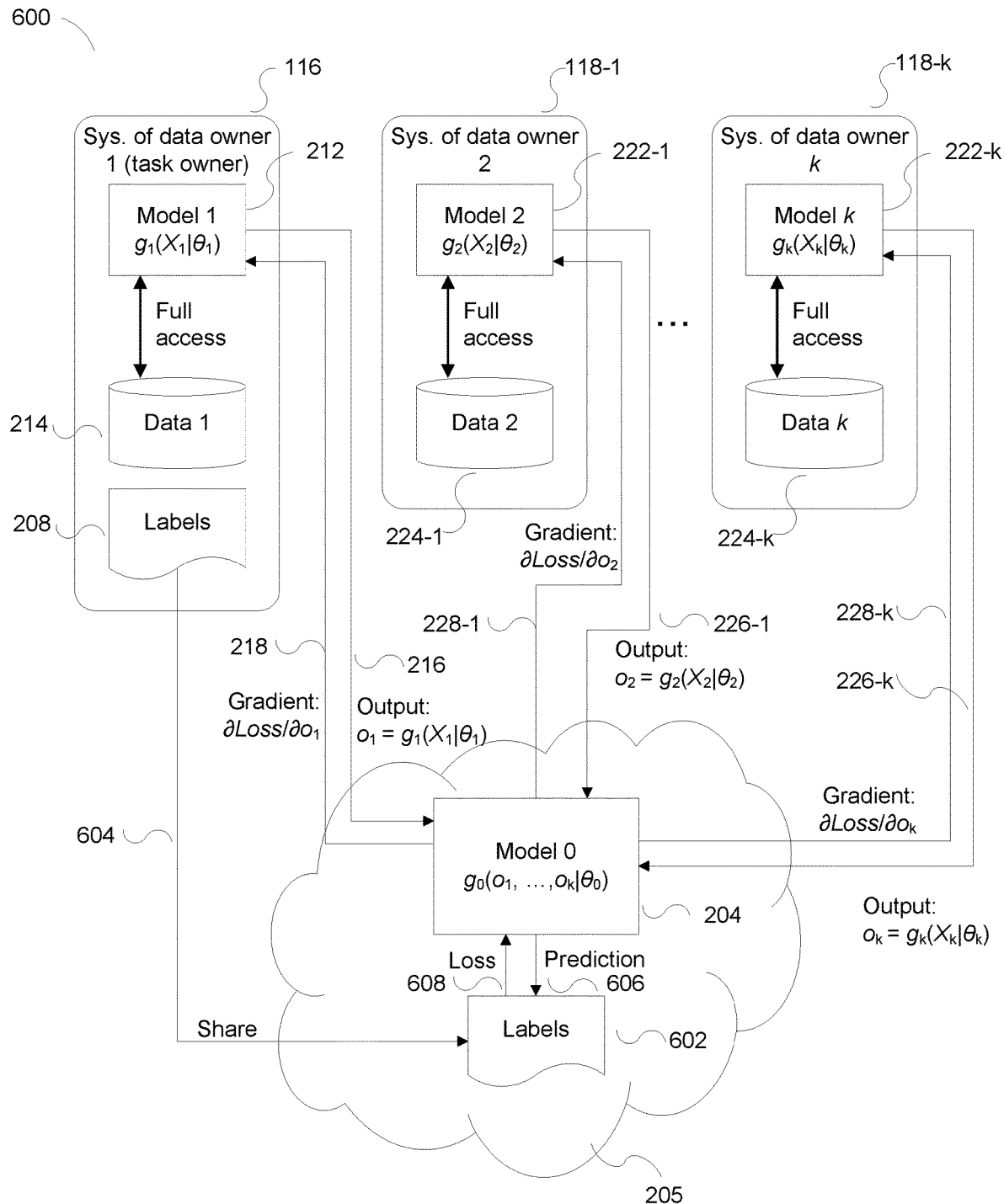
FIG. 6 illustrates a Secure Vertical Federated Learning (SVFL) system for training a machine learning model for a particular task using a supervised learning algorithm according to an alternative embodiment of the present invention.

FIG. 6 illustrates the SLVF system for training a machine learning model for a particular task using a supervised learning algorithm according to another embodiment of the present invention. Similarly to FIG. 2, the illustrated SLVF system 600 is shown during a training phase in which both private machine learning models and a centralized machine learning model are trained. In the embodiment of FIG. 2, the task owner 116 owns and stores the labels related to task T, and the central machine learning model 204 communicates with the computing system 116 of the task owner to compute the loss. In contrast, in the embodiment of the SVFL system 600 shown in FIG. 6, the computing system 116 of the task owner shares certain information with the central server 205 via a communication 604. This information can include the labels 602 and the definition of the loss function related to the task T. Upon receipt of the information 604, the central server 205 can compute the loss independently from the computing system 116 of the task owner. The above embodiment mitigates the need for the central server to communicate with the computing system 116 of the task owner. The information 604 can be communicated to the central server 205 prior to the learning operations being performed, for example using one or more secure messages. Because the computing system 116 of the task owner shares the labels and loss function definition with the central server 205, the central server 205 can compute the loss independently. This reduces communication overhead between the central server 205 and the computing system 116 of the task owner.

The central server 205 may include a training function which is operatively coupled to the central machine learning model 204. The training function may be provided using a computer processor operatively coupled to memory and executing suitable stored computer program instructions. The training function operates to receive a prediction from the central machine learning model 204, compare predictions to associated labels, determine a loss associated with the prediction, and provide the loss to the central machine learning model 204 as training feedback.

In the embodiment of FIG. 6, the SVFL system 600 stores the labels 602 as well as the definition of the loss function (both related to the learning task 7) at a location which is local to the central machine learning model 204. This location can be in memory of the central server or (equivalently) in the cloud. The central server or another associated computing machine instantiated in the cloud can directly compute the loss related to the task T using this stored information. In contrast to FIG. 2, in which the prediction 209 is communicated from the central machine learning model 204 to the computing system 116 of the task owner (e.g. data owner 1), which in turn communicates a loss 210 back to the central machine learning model 204, in FIG. 6, the prediction 606 can be communicated from the central machine learning model 204 to a local or integrated computing component (e.g. of the central server 205) which determines the loss based on the locally stored labels 602 and communicates the loss 608 back to the central machine learning model 204 without further involvement of computing system 116 of the task owner (e.g. data owner 1). Accordingly, the current iteration of training of the central machine learning model 204 can proceed (potentially through multiple iterations) with reduced further communication with the data owners (noting that outputs $o_1$ to $o_k$ may also be required at each iteration, as described below). Because the labels and loss function definition are stored locally, training can proceed with reduced communication overhead.

The embodiment of FIG. 6 allows for an alternate secure vertical federated learning method to be performed by the SVFL system 600 to train the private and central machine learning models. The training method proceeds similarly to that described with respect to FIG. 3A, except for the following differences. First, during initialization 302 the computing system 116 of the task owner additionally sends 604 the labels 208 and the loss function related to the task T to the central server 205. Second, after the central machine learning model 204 generates its prediction $o_0 = g_0 (o_1, \ldots, o_k | \theta_0)$, rather than sending this prediction to the computing system 116 of the task owner, the central machine learning model 204 sends the prediction 606 to the central server 205 or other associated computing device or cloud computing platform which stores the labels 602. This central server 205 (or other computing device or cloud computing platform) computes the loss based on the labels and provides the loss back to the central machine learning model 204. This can occur both during training of the central machine learning model 204 in step 304 and training of one or more private machine learning models 212, 222-1, ..., 222-$k$ in step 308.

Figure 7:
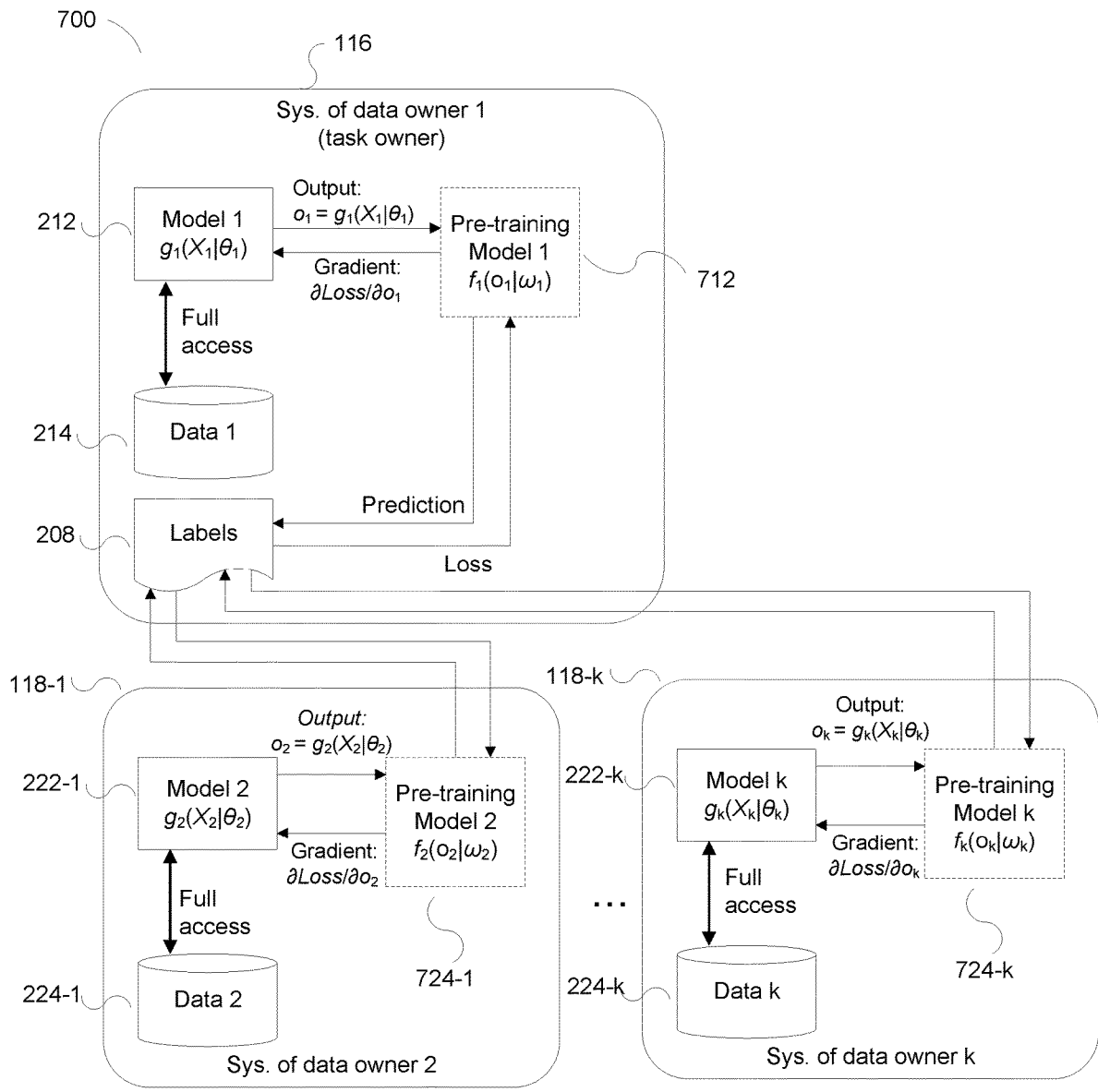
FIG. 7 illustrates a Secure Vertical Federated Learning (SVFL) system for training a machine learning model for a particular task using a supervised learning algorithm according to a further alternative embodiment of the present invention.

FIG. 7 illustrates a further embodiment of a SVFL system that, during a pre-training and training phase, trains private machine learning models as well as a central machine learning model for a supervised machine learning task T. In the embodiment shown in FIG. 7, the private machine learning models 212, 222-1, ..., 222-$k$ of the data owners of the SVFL system 700 are pre-trained. The computing system 116, 118-1, ..., 118-$k$ of each data owner has its own respective pre-training machine learning model 712, 724-1, ..., 724-$k$ associated with its private machine learning model. Labels 208 stored by the computing system 116 of data owner 1 (i.e. the task owner) are used to provide loss feedback which is shared with the pre-training machine learning models 712, 724-1, ..., 724-$k$ of the data owners in the SVFL system 700. Sharing of the losses with computing systems of other data owners is not expected to necessarily constitute an instance of sharing private information between data owners. This is because the losses can be provided as raw data that is free of contextual or meaningful information. Details of the pre-training operation according to various embodiments of the present invention are provided below with respect to FIGS. 8A and 8B.

Figure 8A:
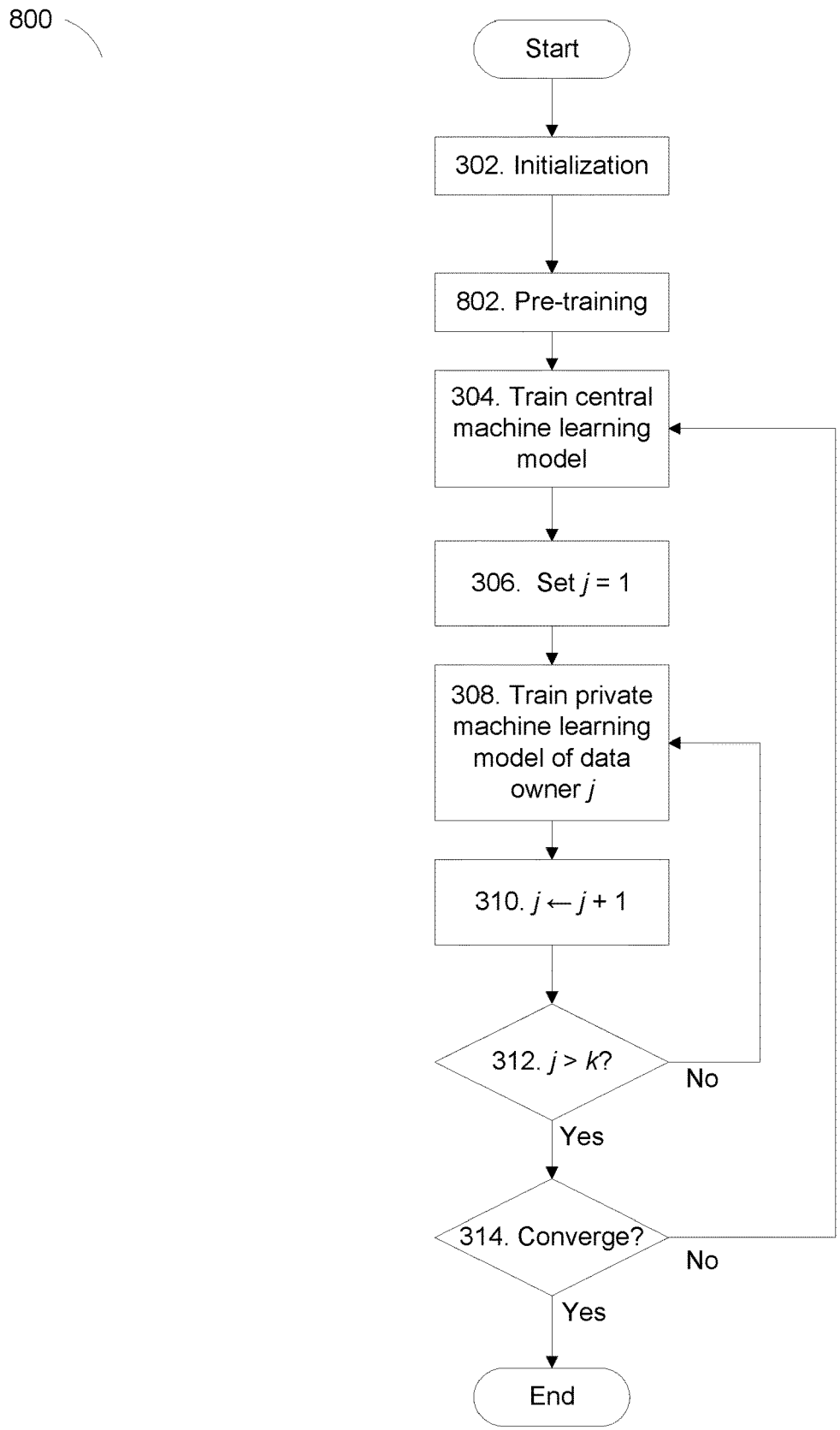
FIG. 8A illustrates a method performed by the SVFL system of FIG. 7 to train the machine learning model for the particular task, according to an embodiment of the present invention.
Figure 8B:
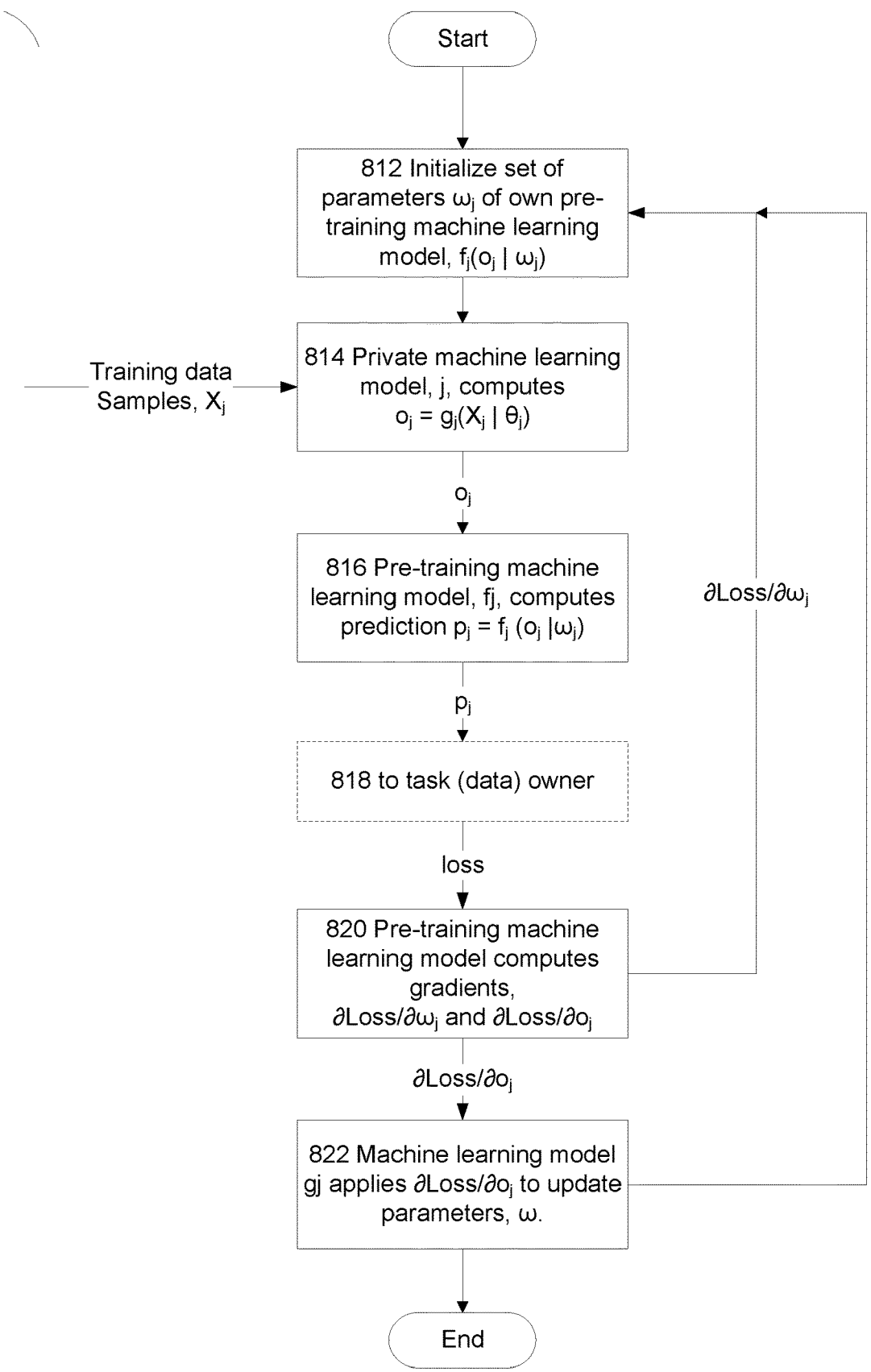
FIG. 8B illustrates further details of the method of FIG. 8A, according to some embodiments of the present invention.

FIGS. 8A and 8B illustrate a method 800 that includes pre-training the SVFL system 700 of FIG. 7. A pre-training step 802 is added to the training method 300 of FIG. 3A and applies to the computing systems 116, 118-1, ..., 118-$k$ of some or all data owners. In the pre-training step 802 (an embodiment of which is illustrated in FIG. 8B) the computing system of each data owner j initializes 812 the set of parameters $\omega_j$ of its own respective pre-training machine learning model. The pre-training machine learning model of data owner j is denoted by $f_j (o_j | \omega_j)$, and associated with its private machine learning model $g_j$. Here, $o_j = g_j (X_j | \theta_j)$ is the output of the private machine learning model $g_j$. Based on a set of (e.g. randomly sampled) training data samples $X_j$, the computing system holding the private machine learning model j computes 814 the output $o_j$ of its private machine learning model for each sampled data sample and sends the output of its private machine learning $o_j$ to its associated pre-training machine learning model $f_j$. Based on the output $o_j$ from the private machine learning model $g_j$, the pre-training machine learning model $f_j$ computes 816 its prediction $p_j = f_j (o_j | \omega_j)$ and sends 818 its prediction $p_j$ to the task owner. Here, if the computing system of data owner j is the computing system 116 of the task owner, then there is no need to send its prediction $p_j$ externally, but rather the prediction is retained and processed internally based on the $p_j$ received from the computing system 118-$j$ of data owner j, the task owner uses its labels and loss function to compute the loss and sends the computed loss back to the pre-training machine learning model 724-$j$ of data owner j. Here, if the computing system of data owner j is the computing system 116 of the task owner, then the loss can be directly computed without communicating the prediction $p_j$ and the loss externally.

Based on the loss received from the task owner, the pre-training the machine learning model $f_j$ (i.e. 724-$j$) includes computing 820 the gradients $\partial Loss/\partial \omega_j$ and $\partial Loss/\partial o_j$. Then, the pre-training machine learning model $f_j$ (i.e. 724-$j$) sends the gradient $\partial Loss/\partial o_j$ to the private machine learning model $g_j$. Based on the gradient $\partial Loss/\partial o_j$ from the pre-training machine learning model $f_j$ the private machine learning model $g_j$ computes 822 the gradient $\partial Loss/\partial \theta_j$. The pre-training machine learning model applies the gradient $\partial Loss/\partial \omega_j$ to update its set of parameters $\omega_j$. At substantially the same time, the private machine learning model $g_j$ applies the gradient $\partial Loss/\partial \theta_j$ to update its set of parameters $\theta_j$. The above steps are iterated until there is convergence of the pre-training machine learning model $f_j$ (i.e. 724-$j$). The pre-training models $f_j$ (i.e. 724-$j$) may be removed after convergence. The method may be repeated for each data owner in the system 700. The remainder of the steps in FIG. 8A proceed as described with respect to FIG. 3A. Training and pre-training can be thought of a process run by a computer and may involve forward propagation and back-propagation.

By using pre-training, an improved starting point for the model parameters $\theta_1, \theta_2 \ldots \theta_k$ can be obtained, prior to further training as described elsewhere herein. This may improve convergence properties such as convergence speed and solution quality. Without pre-training, model parameters are initialized by randomly or otherwise arbitrarily assigning each parameter with a value. This results in arbitrary and possibly highly inaccurate initial conditions. With pre-training, the initial values of the model parameters are not random but instead are values obtained from training the model using a limited training data set. This tends to result in improved initial conditions.

Figure 9:
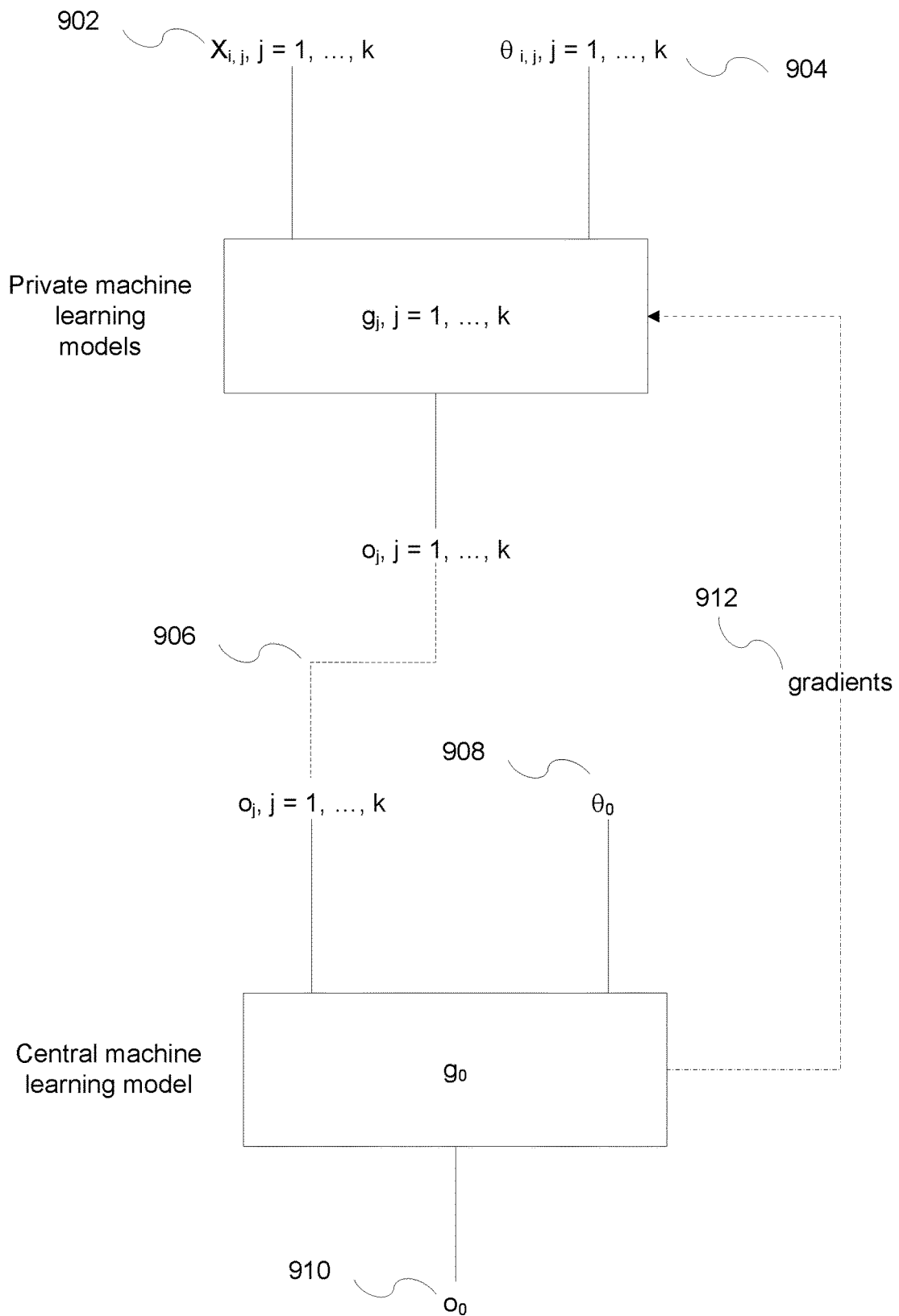
FIG. 9 illustrates a relationship between data owner models and a cloud model, according to an embodiment of the present invention.

FIG. 9 illustrates the relationship between the private machine learning models and the central machine learning model 204, according to an embodiment of the present invention. The private machine learning model for task T, $g_j(X_j|\theta\theta_j)$, $j \in \{1, \ldots, k\}$ for data owner j is shown. $X_j$, $j \in \{1, \ldots, k\}$ 902 is the set of training data samples for the private machine model. $\theta_j$, $j \in \{1, \ldots, k\}$ 904 is the set of parameters for the private machine learning model j of the data owner j. Each training data sample 902 is input to its respective model 212 to produce an output $o_j = g_j(X_j|\theta_j)$, $j \in \{1, \ldots, k\}$ 906, which is the output of the private machine model j with respect to training data sample N. The central machine learning model 204 receives the outputs of the private machine learning models of all data owners, $j \in \{1, \ldots, k\}$, and, initializes its parameters $\theta_0$ 908. Parameters $\theta_0$ are the set of parameters for the central machine learning model $g_0$. The output of the central machine learning model $g_0$, $o_0 = g(o_1, \ldots, o_k|\theta_0)$ 910 is the output of the central machine learning model $g_0$ with respect to $o_1, \ldots, o_k$. Gradients 912 with respect to the output of the computing system of each data owner are sent from the central machine learning model $g_0$ to the private machine learning model $g_j$ of that data owner.

Embodiments of the present invention provide for a method for training a machine learning model to perform a task. This method is performed by a central machine learning model. The method includes receiving sets of outputs by a central machine learning model. Each set of outputs is received from each of a plurality of respective private machine learning models. The set of outputs received from each private machine learning models is generated based on data owned exclusively by an owner corresponding to that particular private machine learning model. The sets of outputs are aligned based on sample IDs of the data. The method includes generating a prediction by the central machine learning model The prediction is the output of the central machine learning model and is generated based on the received sets of outputs. The method includes transmitting the prediction by the central machine learning model, to one of the private machine learning models. The recipient plurality of private machine learning models (and typically each private machine learning model) has associated labels. The method includes receiving, by the central machine learning model, from the recipient private machine learning models, a loss which is determined based on the labels and the prediction. The method includes calculating, by the central machine learning model, a gradient based on the loss, and updating a parameter of the central machine learning model based on the loss.

In further embodiments, the central machine learning model stores the labels locally.

Embodiments according to another aspect include a method for training a machine learning model. This method is performed by a private machine learning model in cooperation with a central machine learning model. The method includes transmitting, by private machine learning model to a central machine learning model, outputs of the private machine learning model. The outputs are generated based on data owned exclusively by an owner corresponding to the private machine learning model. The outputs of the private machine learning model further include sample IDs. The method includes receiving, by the private machine learning model from the central machine learning model, a prediction calculated by the central machine learning model. The prediction is an output of the central machine learning model which is generated based on the private machine learning model outputs. The prediction is aligned with a set of other private machine learning model outputs based on the provided sample IDs as well as sample IDs of other private machine learning model outputs. The other private machine learning model outputs are similarly generated based on data owned exclusively by the other private machine learning models. The method includes calculating, by the private machine learning model, a loss based on the labels and the prediction. The method includes transmitting, by the private machine learning model to the central machine learning model, the loss. The method includes receiving, by the private machine learning model from central machine learning model, a gradient with respect to the output of the private machine learning model based on the loss. The method includes computing, by the private machine learning model, a gradient of the loss with respect to the parameters of the private machine learning model by using the Chain Rule of derivatives, or performing a comparable computation. The method includes updating, by the private machine learning model, a parameter of the private machine learning model based on the loss.

In further embodiments, the private machine learning model includes local data storage for the data owned exclusively by the private machine learning model.

In further embodiments each of the other private machine learning models includes local data storage for the data owned exclusively by each of the other owners corresponding to the other private machine learning models.

Embodiments according to another aspect include a method of generating a prediction using a central machine learning model. The method includes receiving, by the central machine learning model from a private machine learning model, a set of private machine learning model outputs and a sample ID. The set of private machine learning model outputs is based on data owned exclusively by an owner corresponding to the private machine learning model. The method includes transmitting the sample ID, by the central machine learning model, to a plurality of other private machine learning models. The method includes receiving, by the central machine learning model from the other private machine learning models, a plurality of other private machine learning model outputs generated by other private machine learning models based on the sample ID. The method includes calculating a prediction by the central machine learning model. The prediction is output by the central machine learning model based on the set of private machine learning model outputs and the set of other private machine learning model outputs. The method includes transmitting the prediction, by the central machine learning model, to the private machine learning model.

Embodiments according to another aspect include a method of generating a prediction using a private machine learning model. The method includes calculating, by the private machine learning model, a set of private machine learning model outputs associated with a sample ID. The method includes transmitting, by the private machine learning model to a central machine learning model, the set of private machine learning model outputs and the sample ID. The method includes receiving, by the private machine learning model from the central machine learning model, a prediction. The prediction is calculated based on the set of private machine learning model outputs and also based on a plurality of other private machine learning model outputs, which are generated by a corresponding plurality of other private machine learning models based on the sample ID. The method includes calculating, by the private machine learning model, a private (final) prediction based on the prediction.

Embodiments of the present invention provide for a method for training a central machine learning model, the method comprising: receiving, by a server operating the central machine learning model, from each of a plurality of computing systems each operating a different respective one of a plurality of private machine learning models, a set of outputs of the private machine learning models, the set of outputs of the private machine learning models generated based on portions of an identified data sample, wherein different ones of the plurality of computing systems transmit different respective outputs generated based on different respective portions of the data sample, and wherein the set of outputs are aligned based on a sample ID for said data sample; providing a prediction by the central machine learning model, wherein the prediction is generated by the central machine learning model based on the set of outputs received from each of the plurality of private machine leaning models; and receiving a loss by the central machine learning model, the loss computed based a comparison of the prediction with a label corresponding to the data sample, wherein the central machine learning model updates parameters thereof based on the loss.

According to some embodiments, the above method further comprises computing, by the central machine learning model, a gradient of the loss relative to said parameters of the central machine learning model, and subsequently updating said parameters of the central machine learning model based on the gradient. According to some embodiments, providing the prediction comprises transmitting the prediction to a designated computing system of the plurality of computing systems, said designated computing system holding the label, the loss is computed by the designated computing system, and receiving the loss comprises receiving the loss from the designated computing system.

According to some embodiments, the above method further comprises providing the prediction comprises providing the prediction to a training function of the server, said training function holding the label. The loss is computed by the training function, and receiving the loss comprises receiving the loss from the training function. The method additionally includes prior to said receiving the prediction, receiving, by the server from a designated computing system of the computing systems, the label and storing the label in a memory accessible to the server.

Embodiments of the present invention provide for a method for training a private machine learning model, the method comprising: receiving, by a server operating a partially or fully trained central machine learning model, from a plurality of computing systems operating a respective plurality of private machine learning models including said private machine learning model being trained: a sample ID identifying a data sample; and outputs of the plurality of private machine learning models, wherein different ones of the plurality of private machine learning models transmit different respective ones of said outputs generated based on different respective portions of the data sample; providing, by the central machine learning model, a prediction computed by the central machine learning model based on the outputs of the plurality of private machine learning models; receiving, at the server, a loss, the loss computed based a comparison of the prediction with a label corresponding to the data sample; and transmitting, by the server to one of the plurality of computing systems operating the private machine learning model being trained, a gradient of the loss relative to current parameters of the central machine learning model, the gradient determined by the server based on the loss, wherein current model parameters of the private machine learning model being trained are updated based on the gradient.

In some embodiments of the above method, providing the prediction comprises transmitting the prediction to a designated computing system of the plurality of computing systems, said designated computing system holding the label, the loss is computed by the designated computing system, and wherein receiving the loss comprises receiving the loss from the designated computing system.

In other embodiments of the above method, providing the prediction comprises providing the prediction to a training function of the server, said training function holding the label, the loss is computed by the training function, and wherein receiving the loss comprises receiving the loss from the training function, the method further comprising, prior to said receiving the prediction, receiving, by the server from a designated computing system of the computing systems, the label and storing the label in a memory accessible to the server.

Embodiments of the present invention provide for a method for training a central machine learning model, the method comprising: transmitting, by a computing system operating a private machine learning model to a server operating the central machine learning model: one or more sample IDs identifying one or more data samples; and one or more outputs of the private machine learning model, said outputs generated based on portions of the identified one or more data samples accessible to the private machine learning model, wherein different ones of a plurality of computing systems operating a respective plurality of private machine learning models, including the private machine learning model, transmit, to the server, different respective outputs generated based on different respective portions of the one or more data samples, the different respective outputs including the one or more outputs of the private machine learning model; receiving a prediction from the central machine learning model, the prediction computed based on said different respective outputs in combination, said different respective outputs being aligned based on the one or more sample IDs; and providing a loss to the server, the loss computed based a comparison of the prediction with labels corresponding to the one or more data samples, wherein current model parameters of the central machine learning model are updated based on the loss.

According to some embodiments of the above method, updating of the current model parameters based on the loss comprises: determining, by the server, a gradient of the loss relative to current parameters of the central machine learning model; and updating, by the server, the current model parameters of the central machine learning model based on the gradient of the loss.

According to some embodiments of the above method, the computing system operating the private machine learning model comprises private data storage holding portions of the one or more data samples used in generating said one or more outputs of the private machine learning model.

According to some embodiments of the above method, each of the plurality of computing systems operating the respective plurality of private machine learning models comprises respective private data storage each holding a corresponding part of said different respective portions of the one or more data samples.

According to some embodiments, the above method further comprises initiating a task and training the central machine learning model with respect to the task. According to some embodiments, the above method further comprises repeating said method of training until a convergence condition is reached.

According to some embodiments of the above method, the prediction is performed by the computing system operating the private machine learning model, said providing the loss comprises transmitting the loss as computed by the computing system operating the private machine learning model to the server, and the labels are privately accessible to the computing system operating the private machine learning model.

According to some embodiments of the above method, said receiving the prediction and said providing the loss are performed by the server, and the method further comprises, prior to said receiving the prediction, providing, from the computing system operating the private machine learning model to the server, the labels and storing the labels in a memory accessible to the server.

Embodiments of the present invention provide for method for training a private machine learning model, the method comprising: transmitting, by a computing system operating the private machine learning model to a server operating a partially or fully trained central machine learning model: one or more sample IDs identifying one or more data samples; and one or more outputs of the private machine learning model, said outputs generated based on portions of the identified one or more data samples accessible to the private machine learning model, wherein different ones of a plurality of computing systems operating a respective plurality of private machine learning models, including the private machine learning model, transmit, to the server, different respective outputs generated based on different respective portions of the one or more data samples, the different respective outputs including the one or more outputs of the private machine learning model; receiving a prediction from the central machine learning model, the prediction computed based on said different respective outputs in combination, said different respective outputs being aligned based on the one or more sample IDs; providing a loss to the server, the loss computed based a comparison of the prediction with labels corresponding to the one or more data samples; and receiving, by the private machine learning model from the central machine learning model, a gradient of the loss relative to current parameters of the central machine learning model, the gradient determined by the central machine learning model based on the loss, wherein current model parameters of the private machine learning model updates are updated based on the gradient.

According to some embodiments, the above method further comprises computing a revised output based on the updated parameters, and transmitting the revised output to the central machine learning model, wherein the central machine learning model uses said revised output in a subsequent training operation.

According to some embodiments, the above method further comprises computing, by the private machine learning model, a gradient of the loss with respect to parameters of the private machine learning model by using Chain Rule of derivatives; and updating said one or more parameters of the private machine learning model based on said a gradient of the loss with respect to parameters of the private machine learning model.

According to some embodiments, the above method further comprises repeating said method of training until a convergence condition is reached.

According to some embodiments of the above method, said receiving the prediction is performed by the computing system operating the private machine learning model, said providing the loss comprises transmitting the loss as computed by the computing system operating the private machine learning model to the server, and the labels are privately accessible to the computing system operating the private machine learning model.

According to some embodiments of the above method, said receiving the prediction and said providing the loss are performed by the server, and the method further comprises, prior to said receiving the prediction, providing, from the computing system operating the private machine learning model to the server, the labels and storing the labels in a memory accessible to the server.

According to some embodiments of the above method, said receiving the prediction is performed by one of the plurality of computing systems operating one of the plurality of private machine learning models other than the private machine learning model, said providing the loss comprises transmitting the loss as computed by said one of the plurality of computing systems to the server, and the labels are privately accessible to said one of the plurality of computing systems.

Embodiments of the present invention provide for a method for training a central machine learning model, the method comprising: transmitting toward a server operating the central machine learning model, from each of a plurality of computing systems each operating a different respective one of a plurality of private machine learning models, a sample ID and a set of outputs of the private machine learning models, the set of outputs of the private machine learning models generated based on portions of an identified data sample corresponding to the sample ID, wherein different ones of the plurality of computing systems transmit different respective outputs generated based on different respective portions of the data sample, and wherein the set of outputs are aligned based on the sample ID; receiving, by the server, the set of outputs and the sample ID; providing a prediction by the central machine learning model, wherein the prediction is generated by the central machine learning model based on the set of outputs received from each of the plurality of private machine leaning models; and receiving a loss by the central machine learning model, the loss computed based a comparison of the prediction with a label corresponding to the data sample, wherein the central machine learning model updates parameters thereof based on the loss.

According to some embodiments of the above method, providing the prediction comprises transmitting the prediction to a designated computing system of the plurality of computing systems, said designated computing system holding the label, receiving the loss comprises receiving the loss from the designated computing system, and the method further comprises: computing the loss by the designated computing system.

According to some embodiments of the above method, providing the prediction comprises providing the prediction to a training function of the server, said training function holding the label, receiving the loss comprises receiving the loss from the training function, and the method further comprises: prior to said receiving the prediction, receiving, by the server from a designated computing system of the computing systems, the label; storing the label in a memory accessible to the server; and computing the loss by the training function.

Embodiments of the present invention provide for a method for training a private machine learning model, the method comprising: transmitting, toward a server operating a partially or fully trained central machine learning model, from each of a plurality of computing systems operating a respective plurality of private machine learning models including said private machine learning model being trained: a sample ID identifying a data sample; and outputs of the plurality of private machine learning models, wherein different ones of the plurality of private machine learning models transmit different respective ones of said outputs generated based on different respective portions of the data sample; receiving, by the server, the set of outputs and the sample ID; providing, by the central machine learning model, a prediction computed by the central machine learning model based on the outputs of the plurality of private machine learning models; receiving, at the server, a loss, the loss computed based a comparison of the prediction with a label corresponding to the data sample; transmitting, by the server to one of the plurality of computing systems operating the private machine learning model being trained, a gradient of the loss relative to current parameters of the central machine learning model, the gradient determined by the server based on the loss; and updating, by said one of the plurality of computing systems operating the private machine learning model being trained, current model parameters of the private machine learning model being trained are updated based on the gradient.

According to some embodiments of the above method, providing the prediction comprises transmitting the prediction to a designated computing system of the plurality of computing systems, said designated computing system holding the label, wherein receiving the loss comprises receiving the loss from the designated computing system, the method further comprising: computing the loss by the designated computing system.

According to some embodiments of the above method, providing the prediction comprises providing the prediction to a training function of the server, said training function holding the label, the loss is computed by the training function, and wherein receiving the loss comprises receiving the loss from the training function, the method further comprising, prior to said receiving the prediction, receiving, by the server from a designated computing system of the computing systems, the label and storing the label in a memory accessible to the server.

Embodiments of the present invention provide for a method of generating predictions using a trained private machine learning model, the method comprising: transmitting, by a computing system operating the private machine learning model to a server operating a trained central machine learning model: a sample ID identifying a data sample; and a private machine learning model output generated by the private machine learning model based on a portion of the identified data sample, wherein different ones of a plurality of computing systems operating a respective plurality of trained private machine learning models, including the trained private machine learning model, transmit, to the central machine learning model, different respective outputs generated based on different respective portions of the identified data sample, the different respective outputs including the private machine learning model output; and receiving, by the computing system operating the private machine learning model, a prediction from the central machine learning model, the prediction computed based on said different respective outputs in combination, wherein a final prediction is generated by the computing system operating the private machine learning model based on the prediction.

Embodiments of the present invention provide for a computing system comprising a computer processor operatively coupled to memory, and a communication interface, the computing system operating a private machine learning model and configured to: transmit, toward a server operating a trained central machine learning model: a sample ID identifying a data sample; and a private machine learning model output generated by the private machine learning model based on a portion of the identified data sample, wherein different ones of a plurality of computing systems operating a respective plurality of trained private machine learning models, including the trained private machine learning model, transmit, to the central machine learning model, different respective outputs generated based on different respective portions of the identified data sample, the different respective outputs including the private machine learning model output; and receive a prediction from the central machine learning model, the prediction computed based on said different respective outputs in combination, wherein a final prediction is generated by the computing system operating the private machine learning model based on the prediction.

According to some embodiments, the above method comprises outputting (or the above computing system is further configured to output) the prediction from the central machine learning model as the final prediction.

According to some embodiments of the above method or computing system, prior to transmitting the sample ID and the private machine learning model output, the private machine learning model, the plurality of other private machine learning models, and the central machine learning model are collaboratively trained together using vertically partitioned training data, said vertically partitioned training data including other data samples each including plural features, and different subsets of said plural features are accessible to different ones of the plurality of private machine learning models.

According to some embodiments of the above method or computing system, the sample ID and the private machine learning model output exclude said portion of the data sample and further exclude trained parameters of the private machine learning model.

According to some embodiments of the above method or computing system, the private machine learning model output is generated in response to the portion of the identified data sample according to an input-output relationship established into the private machine learning model by prior training.

Figure 10:
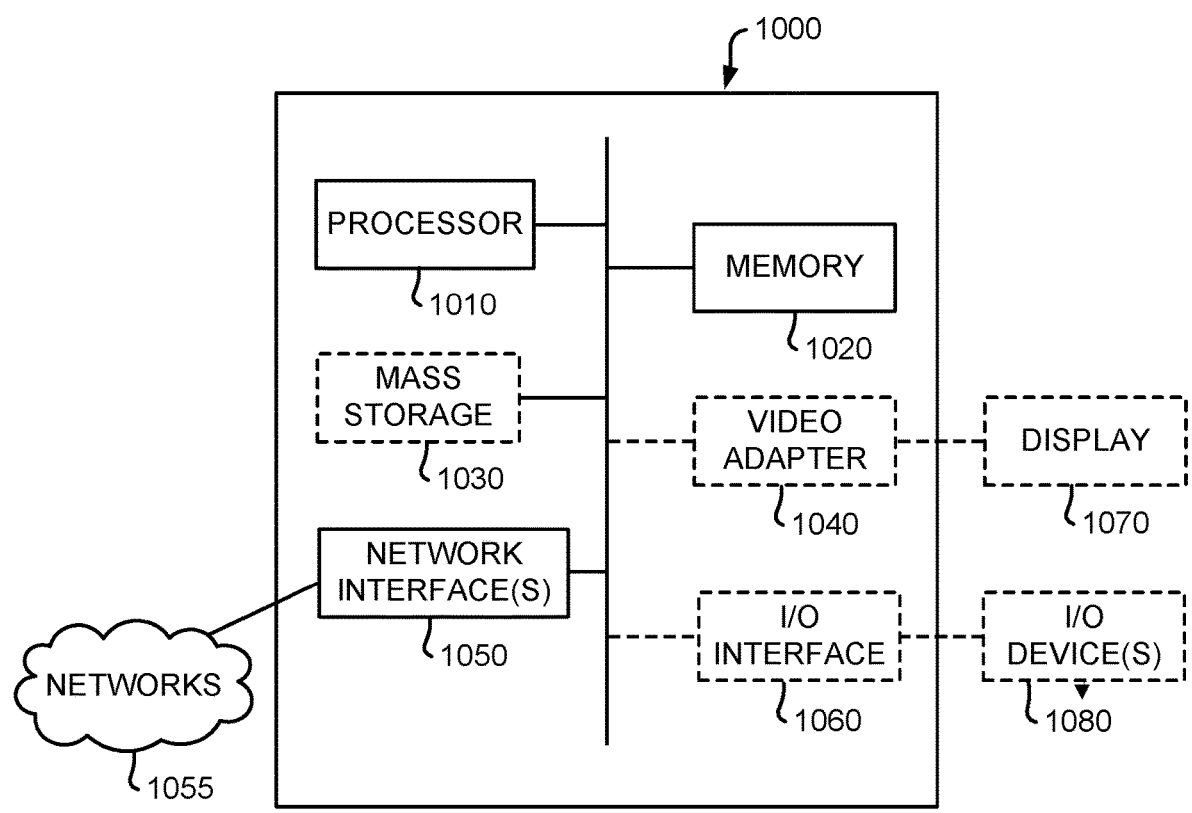
FIG. 10 illustrates a computing device that may be configured to implement SVFLs and methods as described herein.

The machine learning models described herein may be executed on a number of computing systems, either physical or virtual. The computing systems may be centralized or distributed and are used by the computing systems 116, 118, 202 each of the data owners to store models, data and labels. FIG. 10 is block diagram of a computing device that may be used for implementing the embodiments of the methods disclosed herein. In some embodiments, a computing function may be performed across a plurality of virtual and/or physical computing devices located at a plurality of geographic locations. Various physical or virtualized computing resources can be used to implement embodiments of the present invention. Embodiments of the present invention therefore provide for a computer device, or a system of computer devices, which are configured to perform computing and communication operations as described elsewhere herein, for example with respect to various methods specified above. Each data owner may have one or more computing devices such as described in FIG. 10. The central machine learning model may also be implemented using one or more computing devices such as described in FIG. 10.

Specific computing devices may utilize all of the components shown or only a subset of the components, and levels of integration may vary from device to device. Furthermore, a computing device may contain multiple instances of a component, such as multiple processing units, processors, memories, network interfaces, etc. The computing device 1000 typically includes a processor 1010, a bus and a memory 1020, and may optionally also include a mass storage device 1030, a video adapter 1040, and an I/O interface 1060 (each shown in dashed lines to indicate they are optional). The computing system may further include one or more network interface(s) 1050 for connecting the computing system to communication networks 1055.

The processor 1010 may comprise any type of electronic data processor, and may include one or more cores or processing elements. The processor 1010 may be a central processing unit (CPU), a tensor processor unit (TPU), a neural processing unit (NPU), a graphic processing unit (GPU), an application specific integrated circuit (ASIC), and a field programmable gate array (FPGA). The memory may comprise any type of non-transitory system memory such as static random access memory (SRAM), dynamic random access memory (DRAM), synchronous DRAM (SDRAM), read-only memory (ROM), or a combination thereof. In an embodiment, the memory may include ROM for use at boot-up, and DRAM for program and data storage for use while executing programs. The bus may be one or more of any type of several bus architectures including a memory bus or memory controller, a peripheral bus, or a video bus.

The mass storage may comprise any type of non-transitory storage device configured to store data, programs, and other information and to make the data, programs, and other information accessible via the bus. The mass storage may comprise, for example, one or more of a solid-state drive, hard disk drive, a magnetic disk drive, or an optical disk drive.

The video adapter 1040 and the I/O interface 1060 provide optional interfaces to couple external input and output devices to the processing unit. Examples of input and output devices include a display 1070 coupled to the video adapter 1040 and an I/O device 1080 such as a touchscreen coupled to the I/O interface 1060. Other devices may be coupled to the processing unit, and additional or fewer interfaces may be utilized. For example, a serial interface such as Universal Serial Bus (USB) (not shown) may be used to provide an interface for an external device. Alternatively, the computing system may rely upon the network interface(s) for connection to available mass storage(s), video adapter(s), and I/O interface(s) available on the networks.

Additional components, such as one or more graphics processing units, tensor processing units, application specific integrated circuits, field programmable gate arrays, neuromorphic processors, or other electronic or photonic processing components can also be included and used in conjunction with or in place of the processor 1010 to perform processing operations. The processing operations can include machine learning operations, other operations supporting the machine learning operations, or a combination thereof.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for operating a machine learning model, the method comprising:

receiving, by a server operating a central machine learning model $g_0$, from a plurality of computing systems each operating a different respective one of a plurality of private machine learning models a set of outputs $g_1, \ldots, g_k$; a set of outputs $o_1, \ldots, o_k$ of the private machine learning models, wherein each one of the plurality of computing systems transmits a different respective member $o_j$ of the set of outputs for said receipt by the server, each respective member $o_j$ of the set of outputs being generated by a different respective one of the private machine learning models $g_j$ based on a different respective portion $x_{i,j}$ of an identified data sample $x_i$, such that at least one respective portion $x_{i,j}$ is strictly contained within the data sample $x_i$ and each respective portion $x_{i,j}$ is contained within or is equal to the data sample $x_i$, wherein the data sample $x_i$ is data for a single entity, the data sample consists of multiple features corresponding to different aspects of the single entity, and the different respective portions $x_{i,j}$ are different subsets of said multiple features, the set of outputs being aligned based on a sample ID identifying said data sample $x_i$;

providing, by the server, a prediction $o_0$ computed by the central machine learning model $g_0$ based on the set of outputs $o_1, \ldots, o_k$ in combination;

receiving, at the server, a loss, the loss computed based on a comparison of the prediction with a label corresponding to the data sample; and initiating updating of current model parameters of the machine learning model based on the loss.

2. The method of claim 1, further comprising computing, by the server, a gradient of the loss relative to model parameters of the central machine learning model, wherein said updating the current model parameters of the machine learning model being trained is based directly or indirectly on said gradient of the loss.

3. The method of claim 1, wherein providing the prediction comprises transmitting the prediction to a designated computing system of the plurality of computing systems, said designated computing system storing the label, the loss is computed by the designated computing system, and wherein receiving the loss comprises receiving the loss from the designated computing system.

4. The method of claim 1, wherein providing the prediction comprises providing the prediction to a training function of the server, said training function storing the label, and wherein receiving the loss comprises receiving the loss from the training function, the method further comprising: prior to said receiving the prediction, receiving, by the server from a designated computing system of the computing systems, the label and storing the label in a memory accessible to the server; and computing the loss using the training function.

5. The method of claim 1, wherein the machine learning model being trained is the central machine learning model, the method further comprising, by the server, updating said current model parameters of the central machine learning model based on the loss.

6. The method of claim 1, wherein the machine learning model being trained is one of the plurality of private machine learning models, wherein initiating updating of current model parameters of the machine learning model being trained comprises transmitting, by the server, an indication of the loss or an indication of a gradient of the loss to a computing system operating one of the plurality of private machine learning models.

7. The method of claim 6, wherein said gradient of the loss is a gradient relative to model parameters of the central machine learning model, wherein said updating the current model parameters of said one of the private machine learning models is based directly or a gradient of the loss relative to the current model parameters, said gradient of the loss relative to the current model parameters computed from said gradient relative to model parameters of the central machine learning model using a computation implementing a chain rule of derivatives.

8. The method of claim 1, further comprising repeating said method until a convergence condition is reached.

9. A server comprising a computer processor operatively coupled to memory, and a communication interface, the server operating a central machine learning model and configured to:
receive, from a plurality of computing systems each operating a different respective one of a plurality of private machine learning models $g_1, \ldots, g_k$: a set of outputs $o_1, \ldots, o_k$ of the private machine learning models, wherein each one of the plurality of computing systems transmits a different respective member $o_j$ of the set of outputs for said receipt by the server, each respective member $o_j$ of the set of outputs being generated by a different respective one of the private machine learning models $g_j$ based on a different respective portion $x_{i,j}$ of an identified data sample $x_i$, such that at least one respective portion $x_{i,j}$ is strictly contained within the data sample $x_i$, and each respective portion $x_{i,j}$ is contained within or is equal to the data sample $x_i$, wherein the data sample $x_i$ is data for a single entity, the data sample consists of multiple features corresponding to different aspects of the single entity, and the different respective portions $x_{i,j}$ are different subsets of said multiple features, the set of outputs being aligned based on a sample ID identifying said data sample $x_i$;
provide a prediction $o_0$ computed by the central machine learning model $g_0$ based on the set of outputs $o_1, \ldots, o_k$ in combination;
receive a loss computed based on a comparison of the prediction with a label corresponding to the data sample; and
initiate updating of current model parameters of the machine learning model based on the loss.

10. The server of claim 9, further configured to compute a gradient of the loss relative to model parameters of the central machine learning model, wherein said updating the current model parameters of the machine learning model being trained is based directly or indirectly on said gradient of the loss.

11. The server of claim 9, wherein providing the prediction comprises transmitting the prediction to a designated computing system of the plurality of computing systems, said designated computing system holding the label, the loss is computed by the designated computing system, and wherein receiving the loss comprises receiving the loss from the designated computing system.

12. The server of claim 9, wherein providing the prediction comprises providing the prediction to a training function of the server, said training function holding the label, and wherein receiving the loss comprises receiving the loss from the training function, the server further configured to: prior to said receiving the prediction, receive, from a designated computing system of the computing systems, the label; store the label in a memory accessible to the server; and compute the loss using the training function.

13. The server of claim 9, wherein the machine learning model being trained is the central machine learning model, the server further configured to update said current model parameters of the central machine learning model based on the loss.

14. The server of claim 9, wherein the machine learning model being trained is one of the plurality of private machine learning models, wherein initiating updating of current model parameters of the machine learning model being trained comprises transmitting, by the server, an indication of the loss or an indication of a gradient of the loss to a computing system operating one of the plurality of private machine learning models.

15. The server of claim 14, wherein said gradient of the loss is a gradient relative to model parameters of the central machine learning model, wherein said updating the current model parameters of said one of the private machine learning models is based directly or a gradient of the loss relative to the current model parameters, said gradient of the loss relative to the current model parameters computed from said gradient relative to model parameters of the central machine learning model using a computation implementing a chain rule of derivatives.

16. The server of claim 9, further configured to repeat said method of training until a convergence condition is reached.

17. A method for operating a machine learning model, the method comprising:
transmitting, by a first computing system operating a designated private machine learning model $g_j$, to a server operating a central machine learning model: a sample ID; and an output $o_j$ of the designated private machine learning model $g_j$, the output $o_j$ being generated based on a portion $x_{i,j}$ of a data sample $x_i$ identified by the sample ID, wherein each of a plurality of computing systems, including the first computing system, operates a different respective one of a plurality of private machine learning models $g_1, \ldots, g_k$ including the designated private machine learning model $g_j$, and wherein each of the plurality of computing systems transmits a different respective one of a set of private machine learning model outputs $o_1, \ldots, o_k$, including the output $o_j$, each one of the set of outputs $o_1, \ldots, o_k$ being generated based on a different respective portion of the data sample $x_i$, such that at least one of the different respective portions $x_{i,j}$ is strictly contained within the data sample $x_i$ and each respective portion $x_{i,j}$ is contained within or is equal to the data sample $x_i$, wherein the data sample $x_i$ is data for a single entity, the data sample consists of multiple features corresponding to different aspects of the single entity, and the different respective portions $x_{i,j}$ are different subsets of said multiple features, the set of outputs being aligned based on the sample ID;

receiving, by the computing system from the server, a prediction computed by the central machine learning model based on the set of outputs $o_1, \ldots, o_k$ in combination; and providing, by the computing system to the server, a loss, the loss computed based on a comparison of the prediction with a label corresponding to the data sample, said label being held in memory privately accessible by the first computing system and inaccessible by the server and other ones of said plurality of computing systems;

wherein updating of current model parameters of the dedicated private machine learning model is subsequently initiated based on the loss.

18. The method of claim 17, wherein the machine learning model being trained is the central machine learning model or one of the plurality of private machine learning models.

19. The method of claim 17, wherein said updating of the current model parameters of the machine learning model being trained is performed based on a computed gradient of the loss relative to model parameters of the machine learning model being trained.

20. The method of claim 17, wherein each of the plurality of computing systems operating the comprises a respective private data storage, each respective private data storage: accessible by a corresponding one of the plurality of computing systems and inaccessible by the server and other ones of the plurality of computing systems; and holding a corresponding one of the different respective portions of the data sample.

* * * * *

UNITED STATES PATENT AND TRADEMARK OFFICE
CERTIFICATE OF CORRECTION

| | | |
|---|---|---|
| PATENT NO. | : 11,836,583 B2 | |
| APPLICATION NO. | : 17/014204 | |
| DATED | : December 5, 2023 | |
| INVENTOR(S) | : Lingyang Chu et al. | |

It is certified that error appears in the above-identified patent and that said Letters Patent is hereby corrected as shown below:

In the Specification

Column 21, Line 18, "model j with respect to training data sample N. The central" should read --model j with respect to training data sample $X_j$. The central--.

Signed and Sealed this
Nineteenth Day of March, 2024

Katherine Kelly Vidal
*Director of the United States Patent and Trademark Office*